United States Patent
Imanishi et al.

(10) Patent No.: US 9,151,427 B2
(45) Date of Patent: Oct. 6, 2015

(54) RESIN PIPE JOINT

(75) Inventors: Ryo Imanishi, Fukuchiyama (JP);
Masateru Yamada, Sanda (JP);
Kazukiyo Teshima, Sanda (JP);
Takehiro Nakamura, Sanda (JP);
Takayuki Kishimoto, Sanda (JP);
Akihiro Masuda, Sanda (JP); Takeshi Nakagawa, Fukuchiyama (JP)

(73) Assignee: NIPPON PILLAR PACKING CO., LTD., Osaka-Shi (JP)

( * ) Notice: Subject to any disclaimer, the term of this patent is extended or adjusted under 35 U.S.C. 154(b) by 570 days.

(21) Appl. No.: 13/131,943

(22) PCT Filed: Nov. 6, 2009

(86) PCT No.: PCT/JP2009/068964
§ 371 (c)(1),
(2), (4) Date: May 31, 2011

(87) PCT Pub. No.: WO2010/064519
PCT Pub. Date: Jun. 10, 2010

(65) Prior Publication Data
US 2011/0260450 A1      Oct. 27, 2011

(30) Foreign Application Priority Data

Dec. 1, 2008  (JP) ................. 2008-306792
Dec. 2, 2008  (JP) ................. 2008-307692

(51) Int. Cl.
*F16L 35/00*  (2006.01)
*F16L 47/04*  (2006.01)
(Continued)

(52) U.S. Cl.
CPC ............ *F16L 47/04* (2013.01); *F16L 19/005* (2013.01); *F16L 19/028* (2013.01); *F16L 35/00* (2013.01); *F16L 2201/10* (2013.01)

(58) Field of Classification Search
CPC ...... F16L 19/028; F16L 47/04; F16L 2201/10
USPC ............ 285/81, 93, 92, 247, 330, 386, 913, 7
See application file for complete search history.

(56) References Cited

U.S. PATENT DOCUMENTS 3,640,551 A * 2/1972 Shakesby .................. 285/39
4,500,118 A * 2/1985 Blenkush ................. 285/247
(Continued)

FOREIGN PATENT DOCUMENTS

EP          0903529        3/1999
EP          0945664        9/1999
(Continued)

OTHER PUBLICATIONS

European Search Report dated May 21, 2014, 4 pages.

*Primary Examiner* — Michael P Ferguson
*Assistant Examiner* — Jay R Ripley
(74) *Attorney, Agent, or Firm* — Rankin, Hill & Clark LLP

(57) ABSTRACT

In a resin pipe joint having a configuration where, by a screw advancement of a union nut caused by screwing an internal thread to an external thread in a state where a tube is externally fitted to an inner cylinder to form a flared portion, a flaring changing region is pressed by a seal pressing portion, a torque varying portion in which projecting portions of a joint body and recess portions of the union nut are fitted to or unfitted from each other by a flexural displacements of the projecting portions in the direction of the axis in accordance with fastening rotation of the union nut from the vicinity of a portion in front of an end of the screw advancement, the screw advancement being caused by pressing of the seal pressing portion against the flaring changing region is configured.

3 Claims, 13 Drawing Sheets

(51) Int. Cl.
  *F16L 19/028* (2006.01)
  *F16L 19/00* (2006.01)

(56) References Cited

U.S. PATENT DOCUMENTS

| | | | | |
|---|---|---|---|---|
| 6,142,535 | A | * | 11/2000 | Nishio et al. ............... 285/92 |
| 6,688,651 | B2 | * | 2/2004 | Min-cheol ............... 285/92 |
| 2004/0100097 | A1 | | 5/2004 | Fukano et al. |
| 2007/0267869 | A1 | * | 11/2007 | Patel ............... 285/386 |

FOREIGN PATENT DOCUMENTS

| | | |
|---|---|---|
| JP | 62-24091 | 2/1987 |
| JP | 7-260068 | 10/1995 |
| JP | 2005-344796 | 12/2005 |
| WO | 2006/031386 | 3/2006 |

* cited by examiner

View along arrow Y

RESIN PIPE JOINT

TECHNICAL FIELD

The present invention relates to a resin pipe joint having a structure wherein a tube functioning as a fluid transfer path is connected to a resin pipe joint while flaring the tube, and more particularly to a resin pipe joint which is preferred also in piping for a liquid having high purity or ultrapure water to be handled in a production process of various technical fields such as production of semiconductor devices, production of medical equipment and medicines, food processing, and chemical industry, and which is used as means for connecting a fluid apparatus such as a pump, a valve, or a filter, or a tube that is a fluid transfer path.

BACKGROUND ART

As a resin pipe joint of this kind, a tube joint disclosed in Patent Literature 1 is known. Namely, the tube joint is structured in the following manner. A synthetic resin-made tube (1) is forcedly pressed onto a fitting cylinder (5) of a joint body (4), or, as shown in FIG. 2 of Patent Literature 1, a tube end portion (2) is previously flared and then fitted to the fitting cylinder (5). Then, a union nut (6) which is previously fitted to the tube is screwed with the joint body, and forcedly moved in the axial direction of the joint body (4) by performing a fastening operation, whereby a flaring base portion (2a) of the tube (1) is strongly pressed in the axial direction by an edge portion (6a) to seal between the tube (1) and the fitting cylinder (5).

As a structure similar to the above-described one, also a resin pipe joint disclosed in FIGS. 8 and 9 of Patent Literature 2 is known. As disclosed in FIG. 5 of Patent Literature 2 and Patent Literature 3, also a resin pipe joint having a structure in which an end of a tube that is flared and externally fitted to an inner ring is internally fitted to a fitting cylinder of a joint body, and a portion of the tube that is flared to the inner ring is pressed by fastening a union nut to attain a sealing function is known. Both the joints have the structure where a tube end is flared and a sealing function is attained by fastening a union nut. In the former structure in which the tip end of the tube is externally fitted to the fitting cylinder to fix the nut, there is an advantage that a pipe joint can be economically configured by two components or the joint body and the union nut. In the latter structure using the inner ring, there are advantages that leakage can be surely avoided and a stable performance is obtained, and that the reliability is high.

In actual work on a resin pipe joint having such various excellent advantages, there is an item which is always requested to be improved, i.e., that the timing when the fastening of the union nut is ended cannot be clearly known. In a resin-made joint, originally, the fastening torque in an operation of turning a union nut is gradually increased because of the characteristics of the material, and therefore a sense of fastening up which is caused by a sudden increase of the fastening torque is poor unlike the case where a metal material is used, so that the end of fastening is hardly sensuously known. In the case of insufficient fastening, leakage may occur, and, in the case of excessive fastening, the joint may be broken. Such disadvantages are easily caused because the joint is made of a resin. Therefore, fastening of the union nut must be correctly ended.

In the case where a pipe joint is exposedly disposed in a state where the worker can see the whole joint, for example, the position of the screw advancement due to fastening of a union nut can be checked, so that it is relatively easy to know that the fastening end state is attained, or that such a state is approximately attained. In a place where a pipe joint is disposed, such as a narrow gap between other apparatuses, or a hidden place under the roof, a situation where it is impossible or difficult to see the joint often occurs, and the work of fastening the union nut is often performed in a blind manner. Even when the joint cannot be seen, therefore, it is required that the end or near end of the work of fastening the union nut is informed to the worker by any means.

Therefore, Patent Literature 3 discloses a technique in which, at just before the end of fastening of a union nut (2), a projection piece (15) that is projected in the axial direction from a joint body (1) in a cantilevered state, and a projection (23) that is raisedly formed in an end portion of the union nut (2) in the axial direction approach and interfere with each other in the circumferential direction to butt against each other, and the worker can known the end or near end of the fastening, based on a flapping sound which is generated by the projection piece (15) at this time. Namely, sound generating means for informing the fastening end state to the worker by a sound is disclosed.

PRIOR ART LITERATURE

Patent Literature

Patent Literature 1: Japanese Utility Model Registration No. 3,041,899
Patent Literature 2: Japanese Patent Application Laid-Open No. 7-27274
Patent Literature 3: Japanese Patent Application Laid-Open No. 11-230463

SUMMARY OF THE INVENTION

Problem to be Solved by the Invention

The sound generating means enables the end state of fastening due to an operation on the union nut to be checked by means of sound recognition even when the pipe joint portion cannot be seen, and a certain effect is attained. However, it is seldom that an actual site of piping work is in a quiet situation. Usually, piping work is performed under a somewhat noisy situation, such as in a factory in operation, a work in a situation where another work or construction is concurrently performed. Therefore, it is often that the worker cannot hear a flapping sound generated by the resin-made projection piece. In means for informing the end of fastening of a union nut, i.e., fastening end perception means, there remains room for further improvement.

In view of the above-discussed circumstances, it is an object of the invention to provide a resin pipe joint in which, even when a pipe joint portion is in an invisible or less visible place, and even in a work site in a noisy situation, it can be checked that a union nut is in the end or near end of fastening, and which is improved so as to attain high assembling workability and handleability.

Means for Solving the Problem

In one embodiment, the invention 1 is characterized in that a resin pipe joint has: a synthetic resin-made joint body 1 including a fitting cylinder 4 to which an end portion of a synthetic resin-made tube 3 is fittable and attachable while being flared, and an external thread 5; and a synthetic resin-made union nut 2 including: an internal thread 8 which is screwable with the external thread 5; and a seal pressing portion 10 which is actable on a flaring changing region 9 in a flared portion 3A of the tube 3, by a screw advancement of the union nut 2 in a direction of an axis P of the joint body 1, the screw advancement being caused by screwing the internal thread 8 to the external thread 5 in a state where the tube 3 is fitted and attached to the fitting cylinder 4, the flaring changing region 9 is pressed in the direction of the axis P by the seal pressing portion 10 to form a sealing portion S, wherein a projecting portion 20 which is projected in the direction of the axis P, and a recess portion 19 which is recessed in the direction of the axis P to be fittable thereto are distributedly placed in an outer peripheral portion of the joint body 1, and an outer peripheral portion of an end portion in the axial direction of the union nut 2, and a torque varying portion 26 in which the projecting portion 20 and the recess portion 19 are fitted to or unfitted from each other by a flexural displacement of one of them in the direction of the axis P in accordance with fastening rotation of the union nut 2 from the vicinity of a portion in front of an end of the screw advancement is configured, the screw advancement being caused by pressing of the seal pressing portion 10 against the flaring changing region 9.

In one embodiment, the invention is characterized in that, in the resin pipe joint, the projecting portion 20 is formed in an outer peripheral flange 1A of the joint body 1, the recess portion 19 is formed in the end portion of the union nut 2 on a side where the internal thread is formed, and the projecting portion 20 and the outer peripheral flange 1A are configured to be flexurally displaceable in the direction of the axis P.

In one embodiment, the invention is characterized in that, in the resin pipe joint, a protruding portion 20B which is protruded toward a radially outward side from an outer peripheral face 1b of the outer peripheral flange 1A is formed in the projecting portion 20, and a protrusion portion 24 which is protruded toward the radially outward side is formed in a portion of the union nut 2, the portion being adjacent to the recess portion 19 in the direction of the axis P.

In one embodiment, the invention is characterized in that, in the resin pipe joint, the projecting portion 20 and/or the recess portion 19 are formed in a plural number in the circumferential direction, and configured so that the fitting and the unfitting are repeated during when the union nut 2 is turned one rotation.

In one embodiment, the invention is characterized in that, in the resin pipe joint, the projecting portions 20 and/or the recess portions 19 are formed in the circumferential direction at intervals of uniform angles about the axis P.

In one embodiment, the invention is characterized in that, in the resin pipe joint, the joint body 1 and the union nut 2 are made of a fluorine resin.

In one embodiment, the invention is characterized in that a resin pipe joint has: a synthetic resin-made joint body 1 including a fitting cylinder 4 to which an end portion of a synthetic resin-made tube 3 is fittable and attachable while being flared, and an external thread 5; and a synthetic resin-made union nut 2 including: an internal thread 8 which is screwable with the external thread 5; and a seal pressing portion 10 which is actable on a flaring changing region 9 in a flared portion 3A of the tube 3, by a screw advancement of the union nut 2 in a direction of an axis P of the joint body 1, the screw advancement being caused by screwing the internal thread 8 to the external thread 5 in a state where the tube 3 is fitted and attached to the fitting cylinder 4, the flaring changing region 9 is pressed in the direction of the axis P by the seal pressing portion 10 to form a sealing portion S, wherein a first rough peripheral face 24 configured by continuously forming minute asperities in a predetermined amount in the circumferential direction is disposed on a peripheral face of an end portion in the direction of the axis P of the union nut 2, a second rough peripheral face 20 configured by continuously forming minute asperities in a predetermined amount in the circumferential direction is disposed on a peripheral face of an outer peripheral portion of the joint body 1, and a sliding fitting portion 26 in which the first rough peripheral face 24 and the second rough peripheral face 20 are forcedly fitted to each other by a flexural displacement of one of them in accordance with fastening rotation of the union nut 2 from the vicinity of a portion in front of an end of the screw advancement is configured, the screw advancement being caused by pressing of the seal pressing portion 10 against the flaring changing region 9.

In one embodiment, the invention is characterized in that, in the resin pipe joint, the first and second rough peripheral faces 24, 20 are formed by knurls produced by a knurling process.

In one embodiment, the invention is characterized in that, in the resin pipe joint, the first rough peripheral face 24 is formed on an inner peripheral face of the end portion of the union nut 2 on the side where the internal thread is formed, and the second rough peripheral face 20 is formed on an outer peripheral face of a flange 1A of the joint body 1.

In one embodiment, the invention is characterized in that, in the resin pipe joint, the internal-thread formed end portion where the first rough peripheral face 24 is formed is divided in the circumferential direction into a plurality of sections.

In one embodiment, the invention is characterized in that, in the resin pipe joint, the joint body 1 and the union nut 2 are made of a fluorine resin.

Effects of the Invention

In one embodiment, although its detail will be described in the paragraph of embodiments, a torque variation caused by the function of the torque varying portion due to fastening rotation of the union nut, i.e., the mutual fitting and unfitting of the projecting portion and the recess portion by a flexural displacement of one of them in the axial direction is made large, and it is possible to clearly sense the torque variation through a tool (a spanner, a wrench, or the like) which turns the union nut. Therefore, a large torque variation is produced in the end of fastening or near the end, and hence the end of the fastening of the union nut or near the end can be recognized through the feeling of operation. As a result, it is possible to provide a resin pipe joint in which, even when a pipe joint portion is in an invisible or less visible place, and even in a work site in a noisy situation, it can be checked that a union nut is in the end or near end of fastening, and which is improved so as to attain high assembling workability and handleability.

In one embodiment, the projecting portion is formed in the outer peripheral flange of the joint body, the recess portion is formed in the end portion of the union nut on the side where the internal thread is formed, and the projecting portion and the outer peripheral flange are configured to be flexurally displaceable in the axial direction, so that the torque varying portion can be rationally configured. When a protruding portion which is protruded toward the radially outward side is formed in the projecting portion, and a protrusion portion which is protruded toward the radially outward side is formed on the axial direction side of the recess portion, there is an advantage that, depending on the sense due to touching of the fingers, it is possible to check whether the protruding portion and the projecting portion are aligned with each other in the circumferential direction or not, and whether the portions are close to each other in the axial direction or not, i.e., whether the end state or near end state of fastening is attained or not.

When the projecting portion and the recess portion are formed in a plural number in the circumferential direction, and configured so that the fitting and the unfitting are repeated during when the union nut is turned one rotation, there is an advantage that the frequency of the above-described large torque variation is increased, and the sense recognition is made further clear. In this case, when the projecting portions and the recess portions are formed in the circumferential direction at intervals of uniform angles, the fitting and the unfitting are duplicated a plurality of times, and the torque variation is made more prominent. This is preferable.

When the joint body and the union nut are made of a fluorine resin having excellent chemical resistance and heat resistance, even in the case where a fluid is a medical solution or a chemical solution, or the fluid is a high-temperature fluid, the joint structure portion is not deformed, and leakage does not easily occur. Therefore, the good sealing property and the resistance against pulling can be maintained. A fluorine resin is preferable because it is stable at a high temperature, and has high water repellency, a low coefficient of friction, a high chemical resistance, and a high electrical insulating property.

In one embodiment, although its detail will be described in the paragraph of embodiments, the sliding fitting portion in which the first rough peripheral face and the second rough peripheral face are forcedly fitted to each other by a flexural displacement of one of them is configured, and hence the state of near end of fastening, or the state of end of fastening can be recognized on the bases of both a sliding sound and a torque increase (torque variation). Namely, the end of the fastening and the like can be recognized by two kinds of senses, i.e., the sound which is heard in the ears and the torque variation which is felt by the fingertips. As a result, it is possible to provide a resin pipe joint in which, irrespective of the noise situation in the site of work, it can be checked that a union nut is in the end or near end of fastening, and which is improved so as to attain high assembling workability and handleability.

When means for forming the minute asperities by a knurling process which is a common technique is employed, it is possible to construct a practicable resin pipe joint which is economical, and which is suitable to mass production. When the first rough peripheral face which is on the externally fitting side is formed on the union nut that covers the joint body, and the second rough peripheral face which is on the internally fitting side is formed on the joint body, the sliding fitting portion can be rationally configured by a simple structure. When the internal-thread formed end portion is divided in the circumferential direction into a plurality of sections, it is possible to provide a resin pipe joint in which a plurality of first rough peripheral faces that are easily flexurally displaced are disposed, and recognition of the state of end of fastening functions satisfactorily.

In one embodiment, the joint body and the union nut are made of a fluorine resin having excellent chemical resistance and heat resistance, and, even in the case where the fluid is a medical solution or a chemical solution, or the fluid is a high-temperature fluid, the joint structure portion is not deformed, and leakage does not easily occur. Therefore, the good sealing property and the resistance against pulling can be maintained. A fluorine resin is preferable because it is stable at a high temperature, and has high water repellency, a low coefficient of friction, a high chemical resistance, and a high electrical insulating property.

BEST MODE FOR CARRYING OUT THE INVENTION

Figure 7:
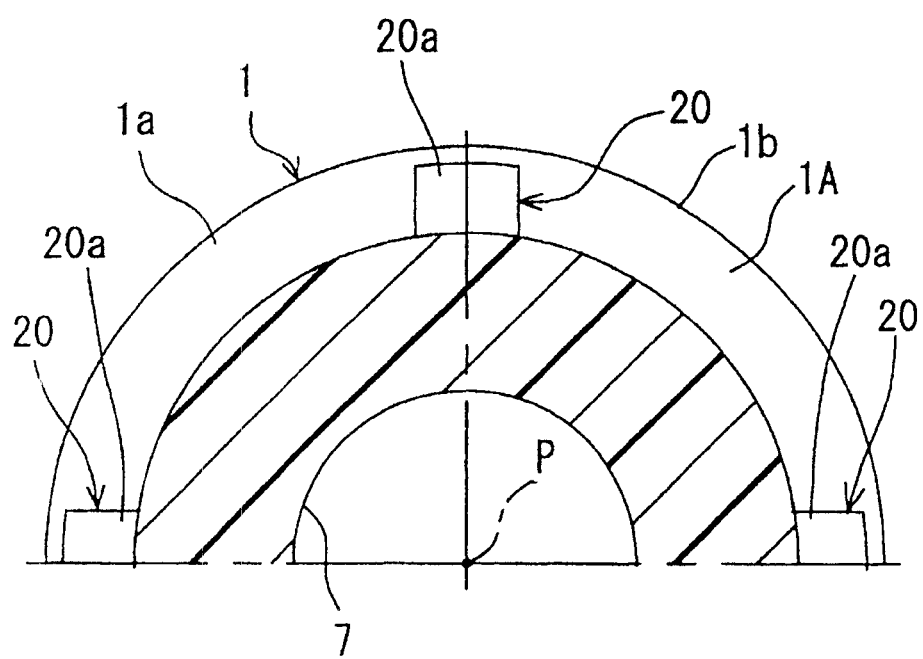
FIG. 7 is a sectional view showing the structure of a flange portion of a joint body in FIG. 6.
Figure 8:
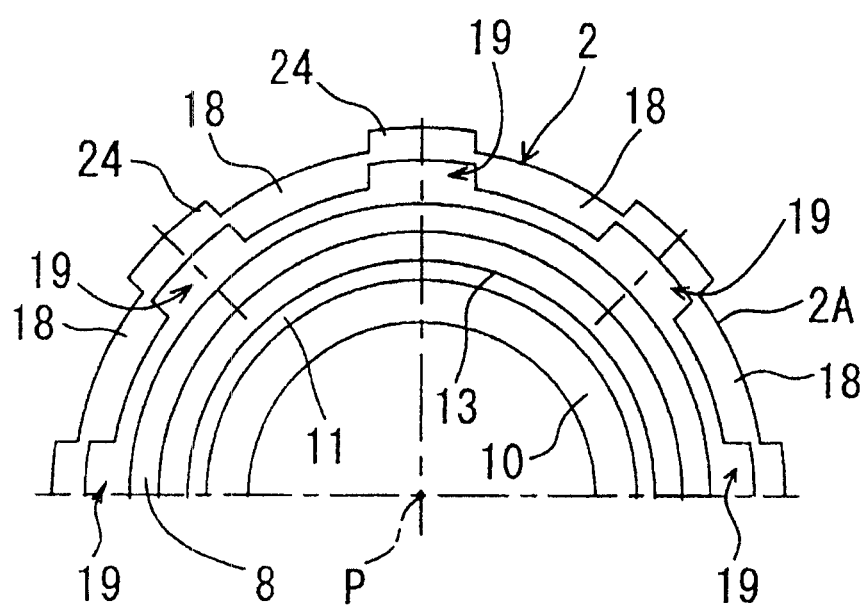
FIG. 8 is an axial direction view showing the recess portions of the union nut in FIG. 6.
Figure 9:
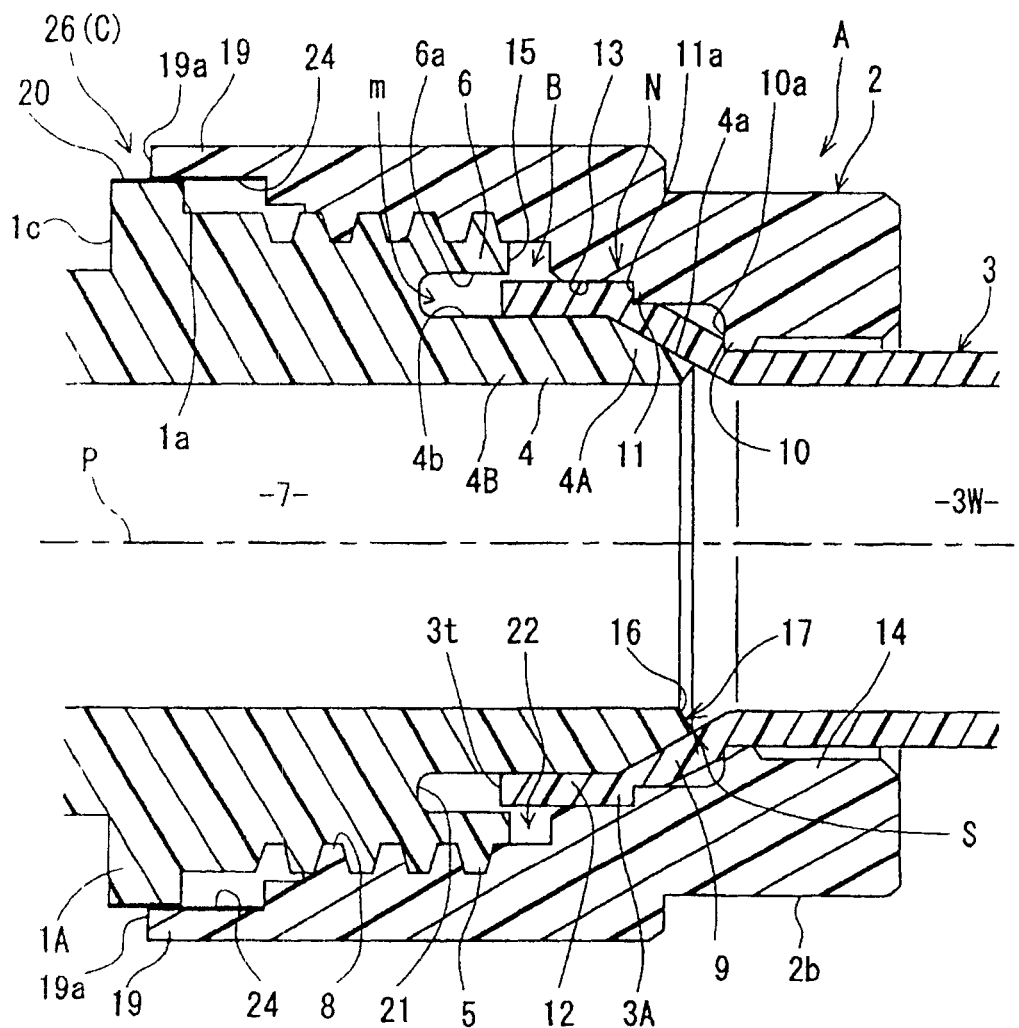
FIG. 9 is a sectional view showing the structure of a resin pipe joint of Embodiment 3.
Figure 10:
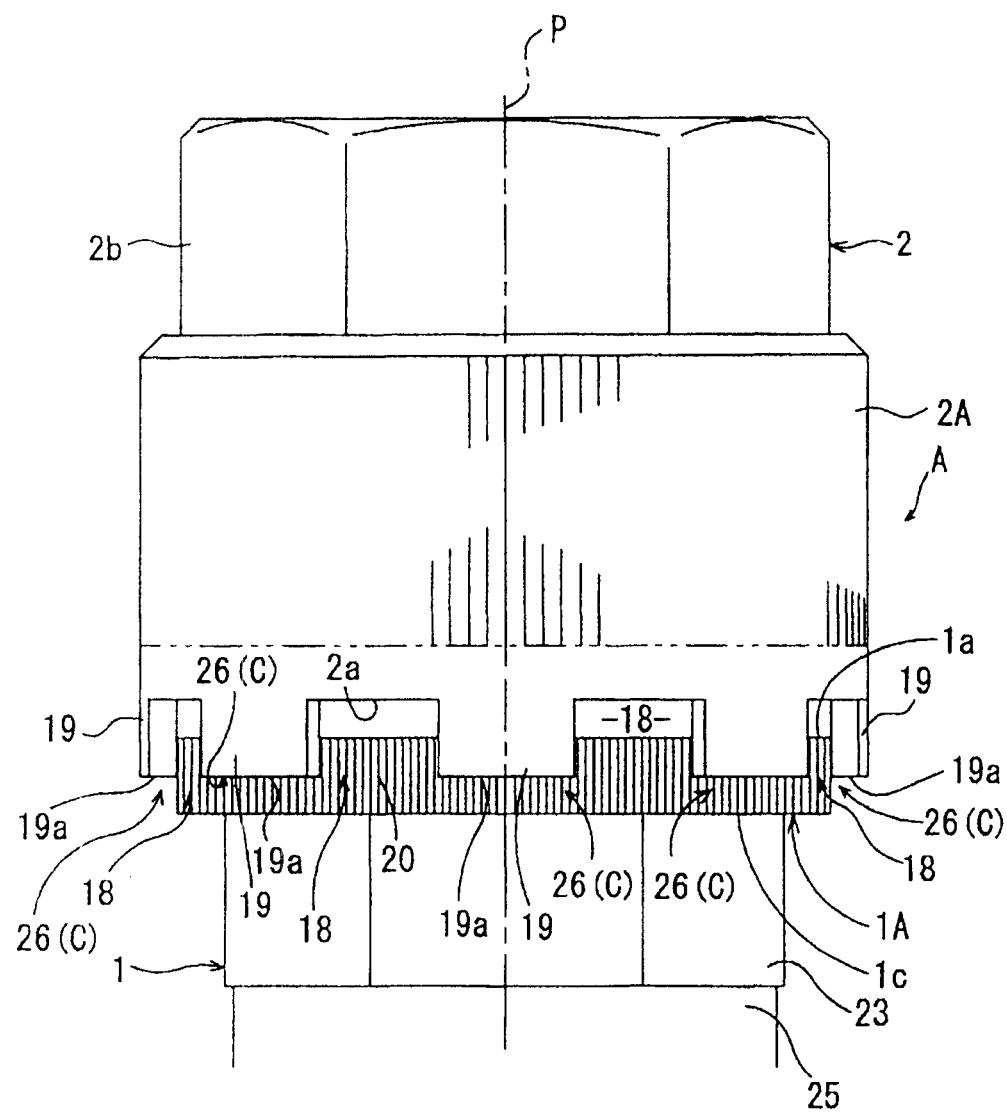
FIG. 10 is a plan view (assembly-completed state) of the resin pipe joint of FIG. 9.
Figure 11:
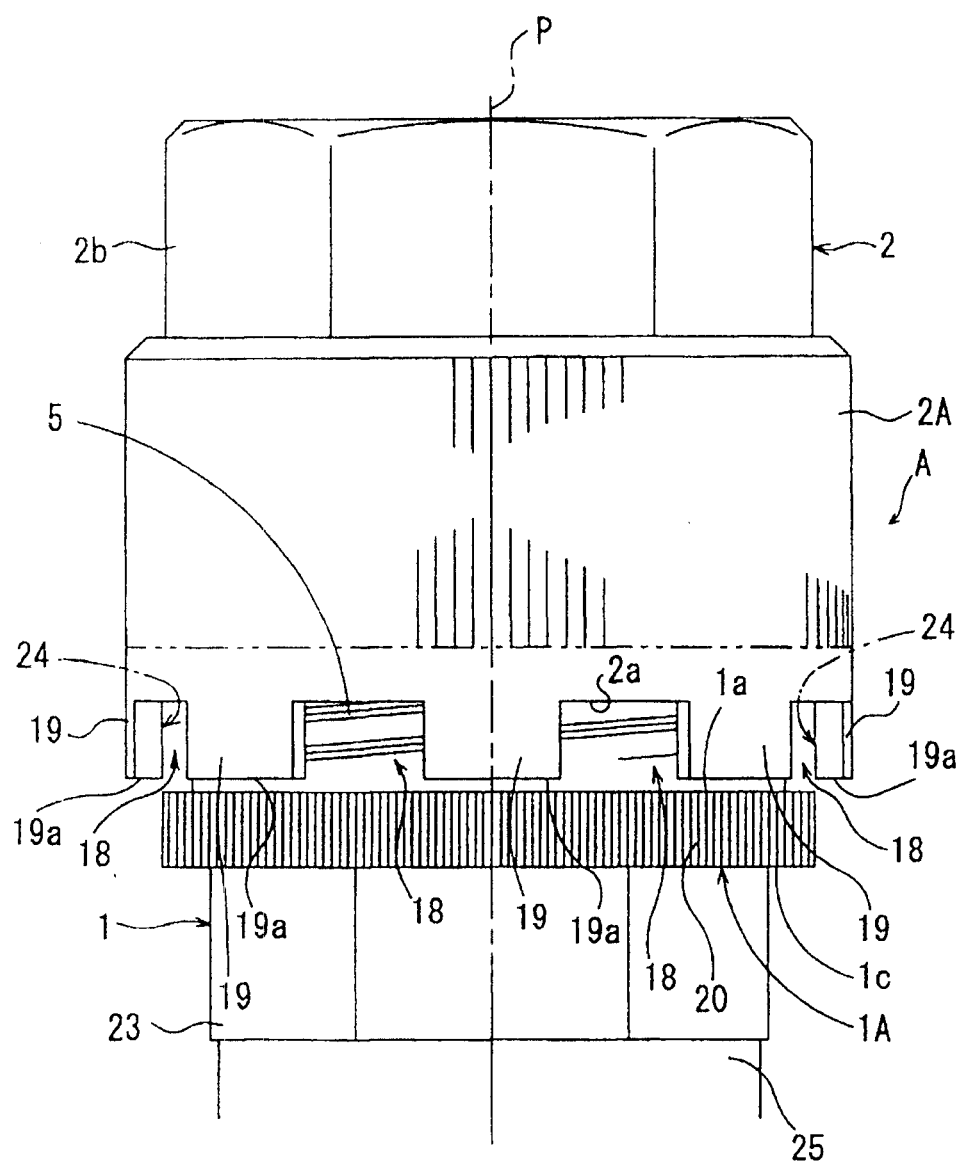
FIG. 11 is a plan view showing a state immediately before the assembling of the resin pipe joint of FIG. 9.

Hereinafter, embodiments of the resin pipe joint of the invention will be described with reference to the drawings. FIGS. 1 to 5 are drawings of a resin pipe joint of Embodiment 1, and FIGS. 6 to 8 are drawings of a resin pipe joint of Embodiment 2. FIGS. 9 to 11 are drawings of a resin pipe joint of Embodiment 3.

Embodiment 1

Figure 1:
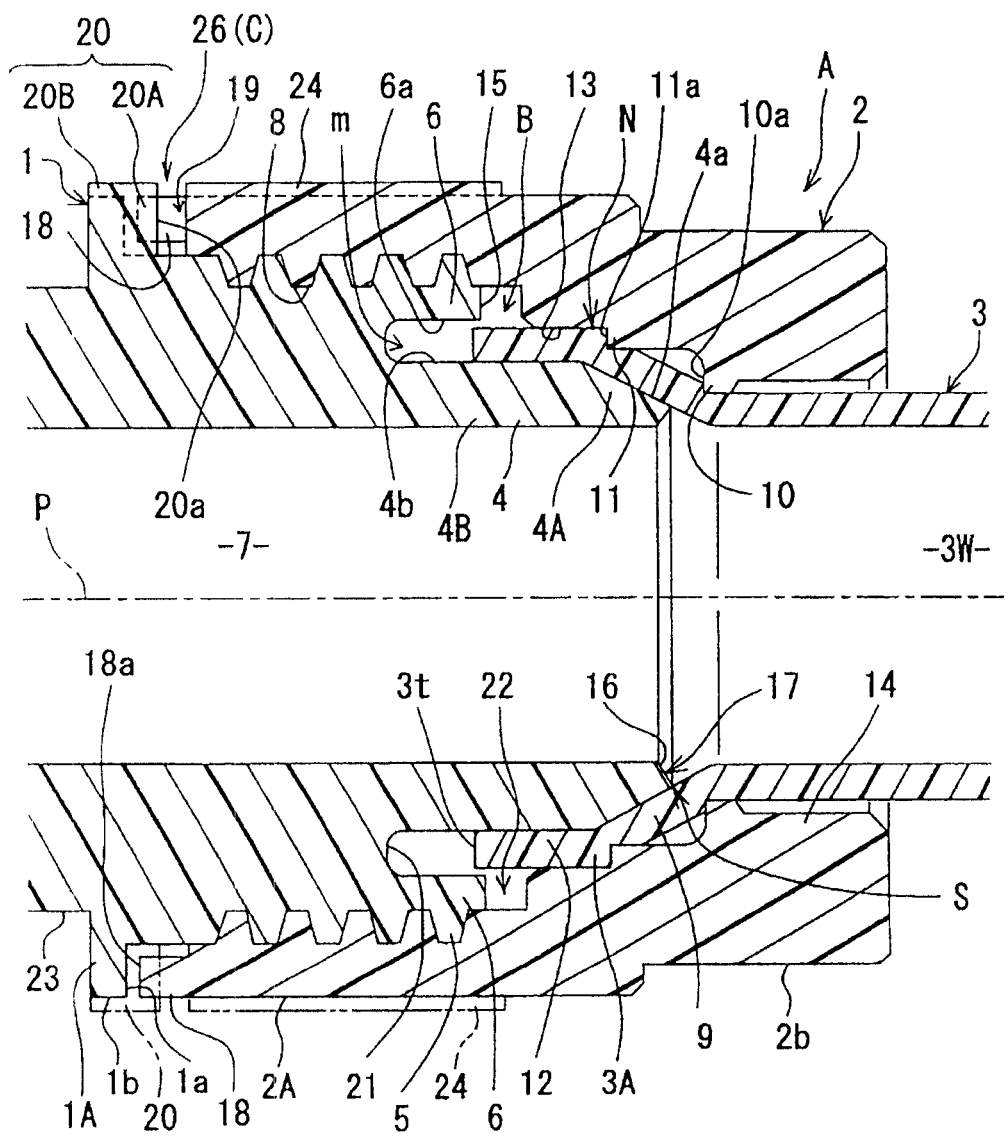
FIG. 1 is a sectional view showing the structure of a resin pipe joint of Embodiment 1.

As shown in FIG. 1, a resin pipe joint A of Embodiment 1 communicatingly connects a tube 3 made of a fluorine resin (an example of a synthetic resin which is typified by PFA, PTFE, and the like) to a fluid apparatus such as a pump or a valve, or a tube of the same or different diameter, and is configured by two components or a joint body 1 made of a fluorine resin (an example of a synthetic resin which is typified by PFA, PTFE, and the like), and a union nut 2 made of a fluorine resin (an example of a synthetic resin which is typified by PFA, PTFE, and the like). FIG. 1 shows a fastening ended state (assembled state) in which the union nut 2 is fastened by a predetermined degree.

Figure 2:
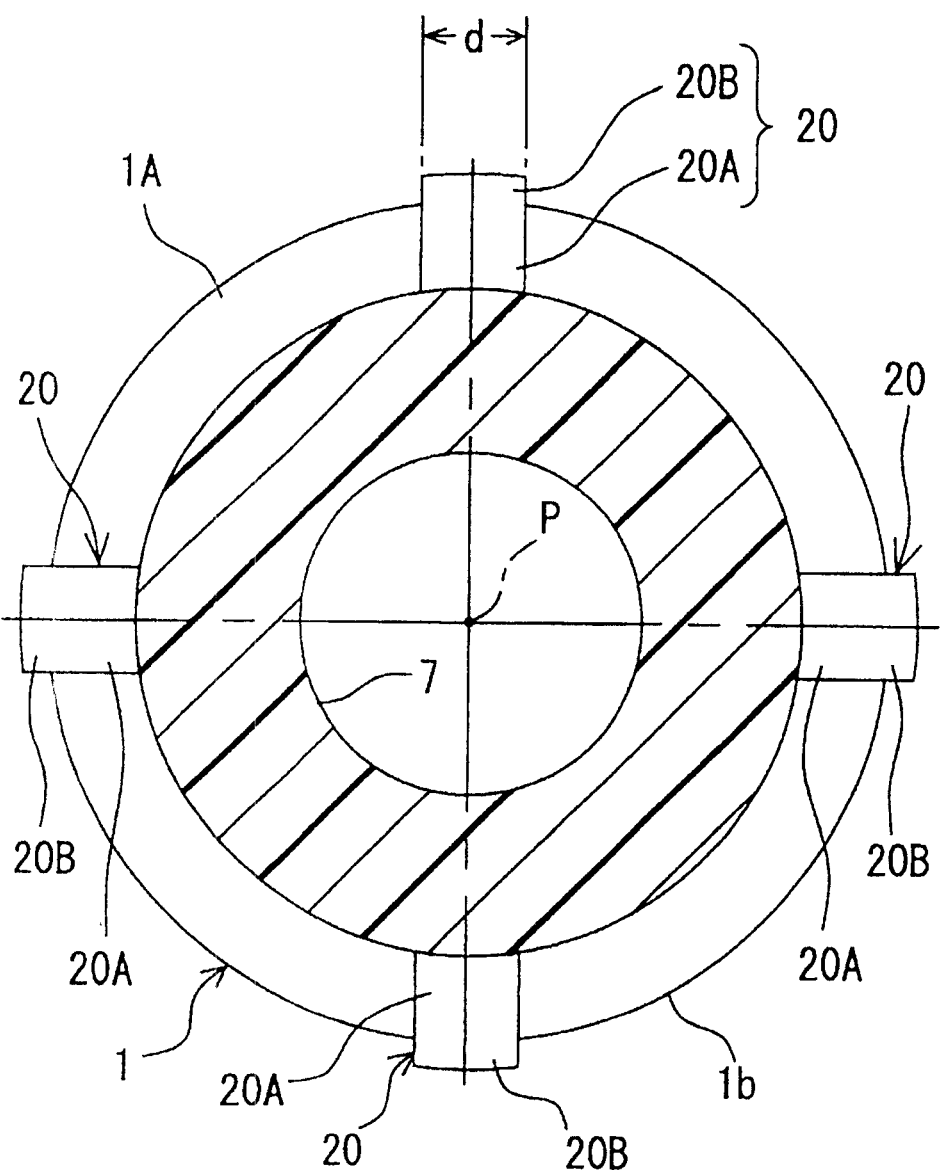
FIG. 2 is a sectional view showing the structure of a flange portion of a joint body.

As shown in FIGS. 1, 2, and 4, the joint body 1 is formed into a cylindrical member including: an inner cylinder (an example of a fitting cylinder) 4 having one end to which an end portion of the tube 3 can be externally fitted and attached while flaring the end portion; a cover cylinder portion 6 which is put over an outer peripheral side of an inner deep side portion of the inner cylinder 4 with forming a peripheral groove m that extends in the direction of the axis P, and that allows the tip end of the flared tube 3 to be inserted; an external thread 5 which is configured by a trapezoidal screw; and a fluid path 7 which is a columnar space having the axis P. The inner cylinder 4 is formed into a tapering and straight shape having an end-tapered cylinder portion 4A which causes the tube 3 to be gradually flared; and a straight barrel cylinder portion 4B which is formed in succession to a large-diameter side of the end-tapered cylinder portion 4A.

In the peripheral groove m, an outer peripheral face which is a peripheral face on the radially inward side is an outer peripheral face 4b of the straight barrel cylinder portion 4B, and that which is a peripheral face on the radially outward side is an inner peripheral face 6a of the cover cylinder portion 6. An outer peripheral flange 1A is formed in a place which is separated by a predetermined length in the direction of the axis P from a deep-side peripheral face 21 of the peripheral groove m. An external thread 5 is formed from a substantially base place of the outer peripheral flange 1A to the outer peripheral face of an end portion of the cover cylinder portion 6. The tip end face of the inner cylinder 4 is formed by a reverse taper angle which, as advancing toward the radially inner side, is closer to the inner deeper side (the deeper side in the direction of the axis P). Namely, a cut face 16 in which the diameter is larger as further advancing toward the tip end is formed, and the shape of a liquid pool peripheral portion 17 formed by expandingly displacing the inner peripheral face of the tube toward the flared portion is made to have an inner-peripheral side flared shape, so that the fluid hardly stagnates in the liquid pool peripheral portion 17.

The cut face 16 is formed so that its maximum diameter has a substantially intermediate value between the inner and outer diameters of the tube 3 in a natural state. However, the value is not limited to this. An operation hexagonal nut portion 23 having a constant width in the direction of the axis P, and a round pipe portion (not shown) which is continuous thereto are formed in the side of the flange 1A opposite to the external thread 5 in the direction of the axis P.

In the outer peripheral flange 1A, as shown in FIGS. 1, 2, and 4, projecting portions 20 which are projected in the axial direction are integrally formed. Each of the projecting portions 20 is configured by a main projecting part 20A which is protruded in the direction of the axis P from a side peripheral face 1a of the outer peripheral flange 1A on the side of the external thread, and an auxiliary projecting part (an example of a protruding portion) 20B which is extended toward the radially outward side from the outer peripheral face 1b of the outer peripheral flange 1A, and has a certain width d. The projecting portions 20 are formed in four places arranged at intervals of uniform angles of 90 degrees about the axis P.

As shown in FIGS. 1, 3, and 4, the union nut 2 includes: an internal thread 8 which is screwable with the external thread 5; a seal peripheral edge (an example of a seal pressing portion) 10 which is actable on a small-diameter end portion of a flaring changing region 9 in a flared portion 3A of the tube 3, the flared portion being externally fitted to the inner cylinder 4; a slipping-off prevention peripheral edge 11 which is actable on a large-diameter end portion of the flaring changing region 9; a pressing inner peripheral portion 13 which is externally fittable to a flared straight portion 12 of the flared portion 3A, the flared straight portion surrounding the constant-diameter straight barrel cylinder portion 4B; and a guide cylinder portion 14 which surrounds the tube 3 over a predetermined length in the direction of the axis P in succession to the seal peripheral edge 10.

In the seal peripheral edge 10, the inner diameter is substantially equal to the outer diameter of the tube 3, and a pressing face 10a is formed as a side peripheral face which is perpendicular to the axis P. In the slipping-off prevention peripheral edge 11, the diameter of the inner peripheral face is set to a value which is larger than the diameter of the outer peripheral face 4b of the straight barrel cylinder portion 4B which has the maximum diameter in the inner cylinder 4, and smaller than a diameter to which the thickness of the tube 3 is added, i.e., the diameter of the pressing inner peripheral portion 13, but may not have such a value (for example: smaller than the diameter of the outer peripheral face 4b) as far as it acts on the large-diameter portion of the flaring changing region 9. Also a pressing face 11a of the slipping-off prevention peripheral edge 11 is a side peripheral face which is perpendicular to the axis P.

The pressing inner peripheral portion 13 is set to a value at which it is press-inserted (pressingly contacted with and externally fitted) to the flared straight portion 12 in a degree in which a radial gap is not formed between the pressing inner peripheral portion and the flared straight portion 12, and co-rotation of the flared portion 3A due to fastening of the union nut 2 does not occur, and slipping-off preventing means N is configured. This is conducted in order that the fastening of the union nut 2 causes the slipping-off prevention peripheral edge 11 to press the flared straight portion 12 so as to bite in the axial direction in order to block slipping off of the tube 3, and relief deformation in which the flared straight portion 12 is radially outward expanded is prevented from occurring by the pressing force, thereby obtaining the enhanced resistance against pulling due to cooperation with the slipping-off prevention pressing portion 11.

Figure 3A:
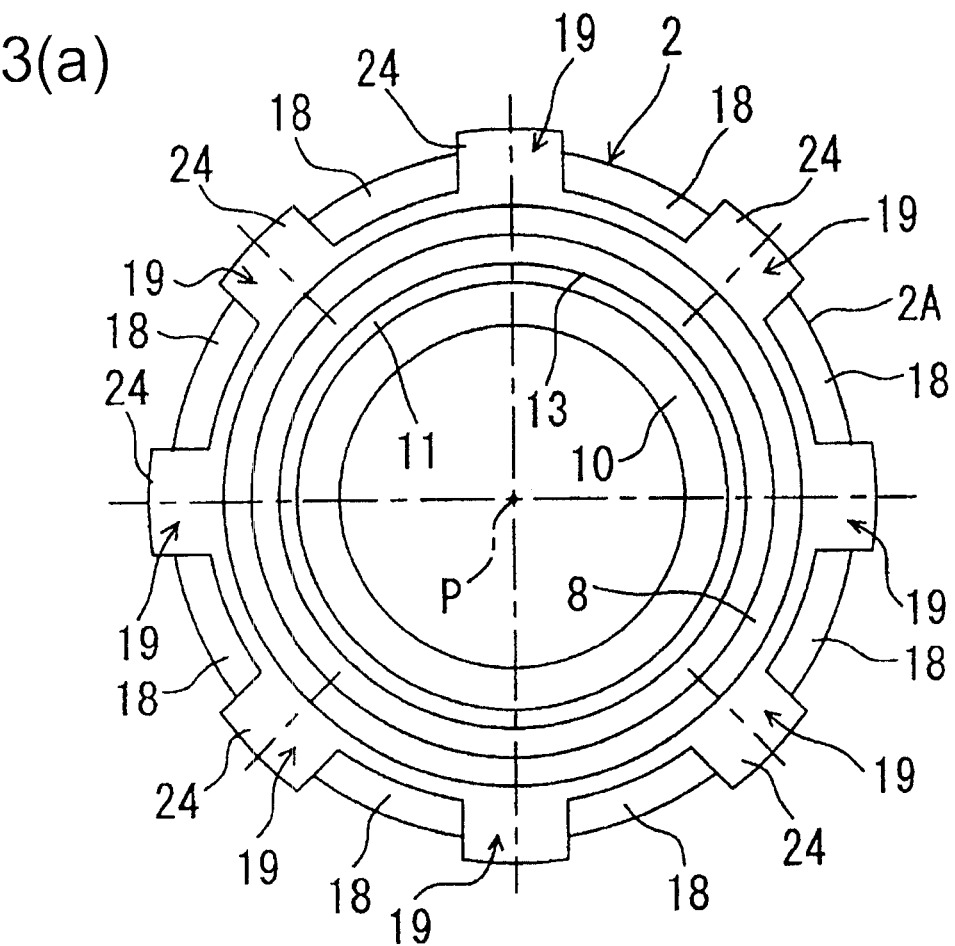
FIG. 3 shows an end portion of a union nut, (a) is an axial direction view, and (b) is a partial bottom view.
Figure 3B:
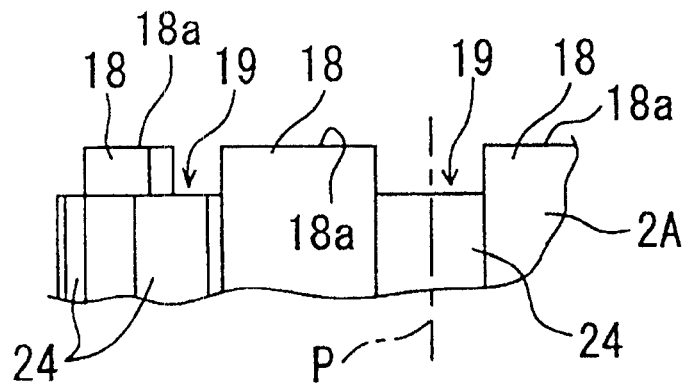

As shown in FIGS. 1, 3, and 4, recess portions 19 which are recessed in the axial direction so as to be fittable to the projecting portions 20 of the joint body 1 are placed in the end of the union nut 2 on the side of the internal thread. In the end on the side of the internal thread, arcuate projections 18 which have an outer diameter that is equal to that of the union nut 2, and an inner diameter that is slightly larger than the diameter of the thread bottom of the internal thread 8, and which extend in the direction of the axis P are formed in a total of eight places arranged at intervals of uniform angles (45 degrees) about the axis P, and the portions between the arcuate projections 18 which are adjacent to each other in the circumferential direction are formed as the recess portions 19. Namely, the recess portions 19 are formed in eight places arranged at intervals of uniform angles of 45 degrees about the axis P. In the outer peripheral face 2A of the union nut 2, protrusion portions 24 which have the same width (the length in the circumferential direction) as the recess portions 19, which extend in the axial direction, and which are slightly protruded toward the radially outward side are formed in eight places which are adjacent to the recess portions 19 in the axial direction [see FIG. 3(a)].

Next, the end portion of the tube 3 is externally fitted and inserted into the inner cylinder 4 by forcibly pushing the tube 3 at normal temperature to be attached while being flared, by heating the tube with using a heating source so as to be easily expandingly deformed and then pushing it, or by previously flaring the tube end with using a flaring machine (not shown) and then pushing it into the inner cylinder 4, so that a state where the tube is inserted until the tube end 3t is positioned deeper than the end wall 15 of the cover cylinder portion 6 is obtained as shown in FIG. 1. As shown in FIGS. 1 and 2, the flared portion 3A which is externally fitted and attached to the inner cylinder 4 is configured by the flaring changing region 9 which is externally fitted to the outer peripheral face 4a of the end-tapered cylinder portion 4A, and the flared straight portion 12 which is externally fitted to the outer peripheral face 4b of the straight barrel cylinder portion 4B.

As shown in FIGS. 1 and 2, namely, it is set so that, by a screw advancement in the direction of the axis P of the joint body 1, the screw advancement being caused by the fastening of the union nut 2 due to screwing of the internal thread 8 to the external thread 5 in a state where the tube 3 is externally fitted and attached to the inner cylinder 4, the pressing inner peripheral portion 13 is externally fitted to the flared straight portion 12, a portion of the large-diameter portion of the flaring changing region 9 is pressed in the direction of the axis P by the slipping-off prevention peripheral edge 11, the diameter of the portion being larger than that of the inner cylinder 4, and the small-diameter portion of the flaring changing region 9 is pressed in the direction of the axis P by the seal peripheral edge 10. The diameter of a fluid transfer path 3W of the tube 3, and that of the fluid path 7 are set to be equal to each other in order to attain a smooth fluid flow. Alternatively, the diameters may be different from each other.

In this case, as described above, the state is formed where a gap is not formed in a radial direction between the pressing inner peripheral portion 13 and the flared straight portion 12, and the flared straight portion 12 is pressingly contacted with and interposed between the straight barrel cylinder portion 4B and the pressing inner peripheral portion 13. In Embodiment 1, the flaring changing region 9 of the tube 3 is formed as a portion which is put over the end-tapered cylinder portion 4A. The flaring changing region 9 is in a state of a tapered pipe which is gradually flared, and the seal peripheral edge 10 and the slipping-off prevention peripheral edge 11 are in positional relationships in which they are separated from each other in the direction of the axis P. As the angle formed by the outer peripheral face 4a of the end-tapered cylinder portion 4A and the axis P is steeper, the distance between the seal peripheral edge 10 and the slipping-off prevention peripheral edge 11 in the direction of the axis P is shorter. The seal peripheral edge 10 and the tip end of the inner cylinder 4 are slightly separated from each other in the direction of the axis P (see FIG. 2 and the like). When the angle of the outer peripheral face 4a is steep, the separation distance is increased, and, when the angle is gentle, the separation distance is decreased.

As shown in FIG. 1, in the predetermined assembled state of the resin pipe joint A, the seal peripheral edge 10 presses the small-diameter end portion of the flaring changing region 9 of the tube 3 in the direction of the axis P, and hence the end of the small-diameter side of the outer peripheral face 4a of the flaring changing region 9, and the inner peripheral face of the tube 3 adjoining the place are strongly pressingly contacted, and a sealing portion S is formed. The sealing portion S in the tip end place of the inner cylinder 4 enables the tube 3 and the joint body 1 to be satisfactorily sealed without causing a fluid such as a washing solution or a medical solution to enter between the inner cylinder 4 and the flared portion 3A.

The flared straight portion 12 of the flared portion 3A which is pressingly externally fitted to the inner cylinder 4 is surrounded by the outer peripheral face 4b of the straight barrel cylinder portion 4B and the pressing inner peripheral portion 13, and held so as not to be expandingly deformed, and the slipping-off prevention peripheral edge 11 is positioned so as to substantially bite the flared straight portion 12. This can resist a pulling force which is acted on the flared portion 3A by engagement of the slipping-off prevention peripheral edge 11 which presses the flared straight portion 12 so as to bite the large-diameter portion of the flaring changing region 9, i.e., substantially the flared straight portion 12, and can brake and block a sliding movement of the flared portion 3A in the slipping-off direction due to that the flared straight portion 12 can be expandingly deformed in a radial direction by the pulling force while using the slipping-off prevention peripheral edge 11 as the basing point.

Even when the flared portion 3A is slightly slidingly moved in the direction of the axis P, also the seal point in the sealing portion S is shifted, and there is a possibility that the sealing function becomes uncertain. This can be prevented from occurring. Therefore, the slipping-off preventing means N for strongly regulating a movement in the direction of the axis P and in the direction along which the flared portion 3A slips off from the inner cylinder 4 is configured, thereby realizing an excellent resistance against pulling. As a result, the flare type resin pipe joint A configured by the joint body 1 and the union nut 2 is realized as an improved configuration which can be simply assembled by a nut operation in a state where the tube is attached to the inner cylinder, thereby attaining an excellent assembling property, and both the excellent sealing property due to the sealing portion S, and the high resistance against pulling due to the slipping-off preventing means N can be attained.

In addition, it is set to a state where, after start of the pressing of the large-diameter portion of the flaring changing region 9 by the slipping-off prevention peripheral edge 11, the pressing of the small-diameter portion of the flaring changing region 9 by the seal peripheral edge 10 is started, namely, it has pressing time difference means, whereby providing the following functions and effects. Namely, when the union nut 2 is turned and fastened (screw advanced), the slipping-off prevention peripheral edge 11 first butts against the flaring changing region 9 (in detail, the large-diameter portion of the flaring changing region 9), and at this time the seal peripheral edge 10 does not reach the flaring changing region 9. Therefore, only the slipping-off prevention peripheral edge 11 presses in the direction of the axis P the large-diameter portion of the flaring changing region 9, in more detail, the portion in which the diameter is larger than that of the straight barrel cylinder portion 4B, and hence a function of pressing the flaring straight portion 12 into the inner deeper portion of the inner cylinder 4 is produced by the operation of fastening the union nut 2.

The flaring straight portion 12 which is pressingly inserted into and externally fitted to the straight barrel cylinder portion 4B butts also against the pressing inner peripheral portion 13. In the case where the press contact force is relatively weak, the portion tries to slide the flared portion 3A so as to be inserted into the inner deeper side of the inner cylinder 4. Therefore, preferred effects are obtained such as that the tube is inserted into the joint body 1 more surely, and that the flaring straight portion 12 which is pressed in the direction of the axis P is hardly moved in the direction of the axis P, and hence tries to radially expand to further enhance the press contact force, thereby producing a function of being firmly interposed. In the case where the press contact force is relatively strong, the flaring straight portion 12 which is pressed in the direction of the axis P is substantially immobile in the direction of the axis P, and hence a strong function of radially expanding is produced, thereby obtaining an effect that the flared straight portion 12 is held more firmly between the inner cylinder 4 and the pressing inner peripheral portion 13.

Anyway, the slipping-off prevention peripheral edge 11 presses the flared portion 3A in the direction of the axis P under the situation where the seal peripheral edge 10 does not exert a function of sticking in the flared portion 3A, thereby obtaining an effect that the press contacting and holding force of the flared straight portion 12 due to the straight barrel cylinder portion 4B and the pressing inner peripheral portion 13 is enhanced. For example, the portion of the flared portion 3A which is pressed by the slipping-off peripheral edge 11 flows to the radially outward side to fill an edge space portion formed by the pressing face 11a and the pressing inner peripheral portion 13. As described above, the pressing time difference means provides an effect that, with respect to the inner cylinder 4 of the tube 3, the press contacting and holding force and the resistance against pulling are further improved.

As shown in FIG. 1, indicator means B which can visually check whether the tube 3 is correctly inserted into the inner cylinder 4 or not may be configured by: the peripheral groove m that is formed by the inner deep side of the inner cylinder 4, and the cover cylinder portion 6; and the union nut 2 that is formed by a transparentable fluorine resin. In the case where viewing is conducted along a line which passes a valley-like inner peripheral face 22 that is on the inner deep side of the pressing inner peripheral portion 13, and that extends to the internal thread 8, when the normal state where the flared portion 3A is seen and the flared end portion 3t is not seen is obtained, it is possible to determine that the tube 3 is correctly externally fitted and attached to the inner cylinder 4. When a mal-insertion state where the flared portion 3A is seen and the flared end portion 3t is seen is obtained, or when an insufficient insertion state where the flared portion 3A itself is not seen is obtained, it is possible to determine that the insertion of the tube 3 does not reach a specified amount. In this case, an operation of further pressing the tube 3 is performed until the above-described normal state can be seen.

In the indicator means B, the union nut 2 is formed by using a transparent or translucent (opalescent or the like) fluorine resin, and an object thereinside can be visually checked. In viewing along the line which passes the valley-like inner peripheral face 22 that is on the inner deep side of the pressing inner peripheral portion 13, and that extends to the internal thread 8, particularly, the flared portion 3A can be visually checked in a relatively clear manner by see-through of only the reduced-thickness portion of the union nut 2. In the region of the pressing inner peripheral portion 13 which is thicker than the region of the valley-like inner peripheral face 22, by contrast, the visuality of the flared portion 3A is inferior, and it is hardly seen.

In the portion of the peripheral groove m into which the end portion of the tube 3 can enter, the union nut 2 and the cover cylinder portion 6 overlap with each other. Although also the joint body 1 is transparentable, the thickness is larger than that of the portion of the valley-like inner peripheral face 22, and also a change of the refractive index in the interface caused by the overlap of the external thread 5 and the internal thread 8 is added, so that it is substantially impossible to visually check where the flared end portion 3t is positioned. In the case where the joint body 1 is untransparentable because of coloring or the like, it is a matter of course that, in the side of the cover cylinder portion 6 which is deeper than the end wall 15, the flared portion 3A and the flared end portion 3t cannot be seen.

Therefore, it is possible to provide the resin pipe joint A in which the function of the indicator means B determining whether the normal state where the flared portion 3A is seen from the valley-like inner peripheral face 22 and the flared end portion 3t is not seen can be visually checked or not allows a visual check to be performed in the assembled state after the union nut 2 is fastened, and which has excellent convenience of use.

Because of the existence of the peripheral groove m and cover cylinder portion 6 for constituting the indicator means B, it is possible to attain also an effect that it functions also as an indicator in the case where the tube 3 is inserted into the inner cylinder 4. Namely, it is possible to check whether the amount of insertion of the tube 3 into the inner cylinder 4 after being flared reaches a predetermined amount or not. In other words, it is requested that the end portion 3t which is inserted into the inner cylinder 4, and which functions as the flared portion 3A exists deeper than the end wall 15, and there is an advantage that it functions also as means for visually checking and determining whether it is good or not, when the tube 3 is assembled to the inner cylinder 4.

In the resin pipe joint A, fastening end perception means C which can inform the worker of the end of the fastening of the union nut 2 or near the end in an assembling work state in which the tube 3 is inserted, and then fastened and fixed by the union nut 2, through the feeling of operation is disposed. As shown in FIGS. 1 to 5, the fastening end perception means C is configured by disposing a torque varying portion 26 configured by: the above-described projecting portions 20 which are formed in the flange 1A of the joint body 1; and the above-described recess portions 19 which are formed on the tip end side (on the side of the internal thread 8) of the union nut 2.

FIG. 1 shows the assembled state as the pipe joint in which the four projecting portions 20 enter the corresponding four recess portions 19 by a predetermined length in the direction of the axis P. In the side which is lower than the axis P in the sheet of FIG. 1, the place where the side peripheral face 1a of the outer peripheral flange 1A is opposed to the arcuate projections 18 is drawn. In the assembled state, there are gaps in the direction of the axis P between the side peripheral faces 18a of the tip ends of the arcuate projections 18 and the side peripheral face 1a of the outer peripheral flange 1A, and gaps in which the length in the direction of the axis P is larger than that of the gaps are formed between the projecting portions 20 and the four recess portions 19.

Figure 4A:
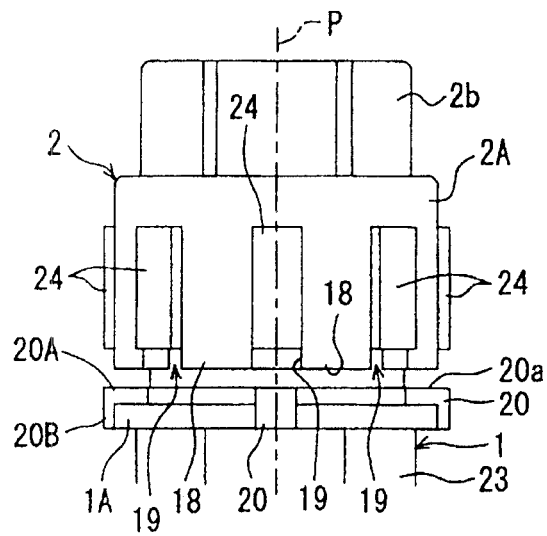
FIG. 4 shows assembling functions of the joint of FIG. 1, (a) shows a state where recess portions and projecting portions are separated from each other, (b) shows a state where the tip end of the union nut butts against an outer peripheral flange, and (c) shows a state where the projecting portions are fitted to the recess portions.
Figure 4B:
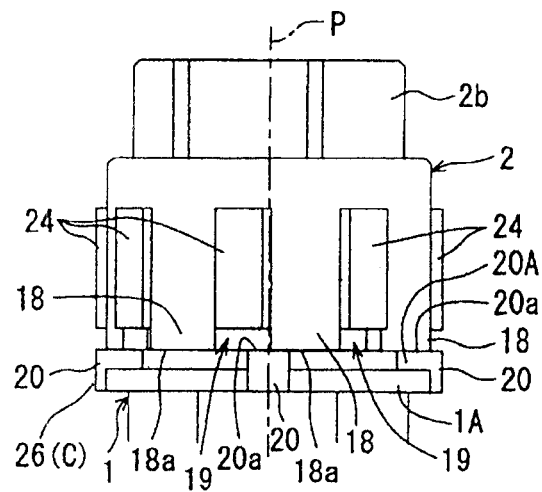

Next, the function of the torque varying portion 26 will be described. When the union nut 2 which is screwed to the joint body 1 is turned and screw advanced, the arcuate projections 18 gradually approach the outer peripheral flange 1A as shown in FIG. 4(a). When the fastening rotation on the union nut 2 is continued, as shown in FIG. 4(b), the tip end faces 18a of four of the eight arcuate projections 18 butt against butting faces 20a (the side peripheral faces of the main projecting parts 20A) of the corresponding four projecting portions 20 at a blunt angle of incidence (the angle due to the pitch of the external thread 5 and the internal thread 8).

Figure 4C:
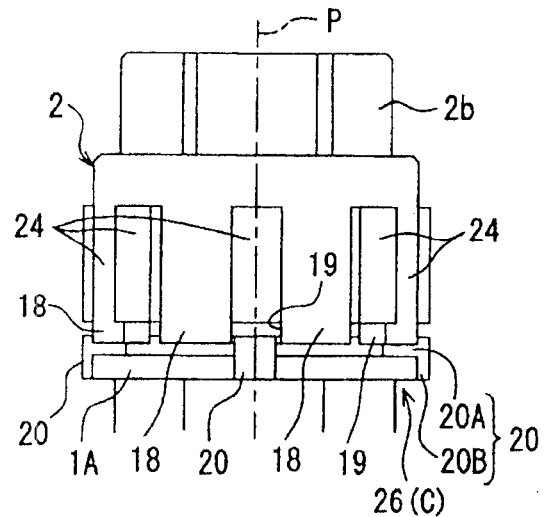
Figure 5:
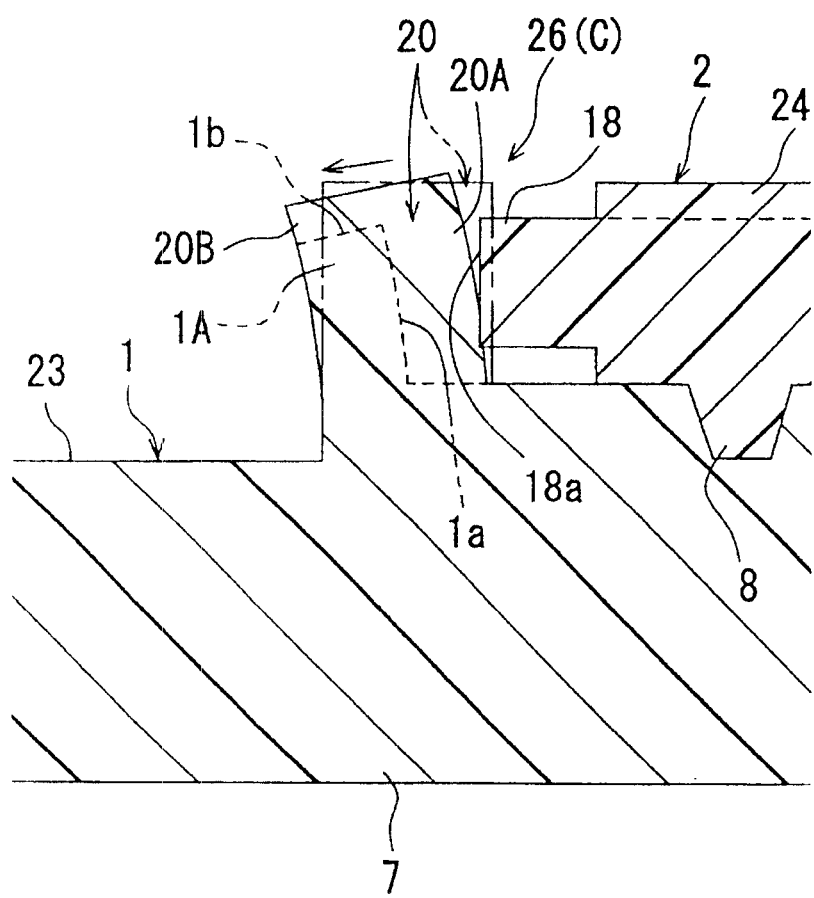
FIG. 5 is a function view showing a situation where the outer peripheral flange is pressed by a remaining peripheral portion to be flexed.

When the union nut 2 is further turned in the fastening direction, the arcuate projections 18 press the projecting portions 20 in the direction of the axis P to flexurally displace the projecting portions 20 and the outer peripheral flange 1A (see FIG. 5), therefore the arcuate projections 18 can pass over the projecting portions 20, and the projecting portions 20 which reach the next recess portions 19 can be restored and displaced to the original attitude, to provide a state where the projecting portions enter these recess portions 19 as shown in FIG. 4(c). As shown in FIG. 5, namely, the outer peripheral flange 1A which is in a state similar to a cantilevered state of an inner peripheral portion, and which is relatively easily deformed is flexurally displaced toward the hexagonal nut portion 23 so as to be turned together with the projecting portions 20 that receive a force in the direction of the axis P, whereby the flange is allowed to avoid interferences of the projecting portions 20 with the arcuate projections 18, and the projecting portions 20 and the corresponding four recess portions 19 are fitted to each other as shown if FIG. 4(c).

Namely, the phenomenon in which the eight arcuate projections 18 for forming the recess portions 19 are caused to interfere with the four projecting portions 20 by the operation of turning the union nut 2 can be avoided by the flexural displacements of the projecting portions 20 and the outer peripheral flange 1A in the portions in the direction of the axis P. The flexural displacements of the projecting portions 20 and the outer peripheral flange 1A in the portions in the direction of the axis P (see FIG. 5), and the succeeding fittings of the projecting portions 20 and the recess portions 19, i.e., restoring displacements of the projecting portions 20 and the outer peripheral flange 1A in the portions are thereafter repeated. When the arcuate projections 18 interfere with the projecting portions 20, the state where the edges 10, 11 bite the flared portion 3A at a certain degree, i.e., the setting in which the fastening (screw advancement) by turning the union nut 2 is substantially ended to terminate the assembling of the resin pipe joint A is attained.

In summary, the resistance produced when the four projecting portions 20 and the outer peripheral flange 1A in the portions are flexurally displaced so as to be tilted in the direction of the axis P functions as a strong rotation resistance on the union nut 2, and the torque variation (torque increase) is clearly transmitted to the fingers through the tool operating the hexagonal nut portion 2b, such as a spanner or a wrench. As the union nut 2 is further turned, the fitting length of the projecting portions 20 and the recess portion 19 in the direction of the axis P is more increased (amounts of interferences of the arcuate projections 18 with the projecting portions 20 in the direction of the axis P are more increased), the flexural displacements of the projecting portions 20 and the outer peripheral flange 1A in the portions for avoiding interferences of the arcuate projections 18 with the projecting portions 20 are made more prominent, and the clear torque variation itself is gradually increased. Therefore, the worker can surely sensuously know the end of the fastening of the union nut 2 or near the end.

Namely, the torque varying portion 26 is configured in which the projecting portions 20 that are formed in the outer peripheral portion of the flange 1A of the joint body 1, and that are projected in the direction of the axis P, and the recess portions 19 that are formed in the end portion in the direction of the axis P of the union nut 2, and that are recessed in the direction of the axis P are fitted to or unfitted from each other by flexural displacements of the projecting portions 20 and the outer peripheral flange 1A in the portions in the direction of the axis P in accordance with fastening rotation of the union nut 2 from the vicinity of a portion in front of an end of the screw advancement caused by pressing of the seal pressing portion 10 against the flaring changing region 9. The fastening end perception means C is configured by the existence of the torque varying portion 26.

In the torque varying portion 26, the auxiliary projecting parts 20B which are protruded toward the radially outward side from the outer peripheral face 1b of the outer peripheral flange 1A are formed in the projecting portions 20, and the protrusion portions 24 which are protruded toward the radially outward side are formed in the places which are adjacent to the recess portions 19 of the union nut 2 in the direction of the axis P. According to the configuration, in the case, for example, where the pipe joint A is placed in a less visible place, depending on the sense due to touching of the fingers, it is easily recognized whether the state [the state of FIG. 4(c)] where the auxiliary projecting parts 20B and the protrusion portions 24 having the same diameter as that of the parts are aligned with each other in the circumferential direction is formed or not, and whether they are very close to each other in the direction of the axis P or not. Namely, there is an advantage that the check whether the assembled state where the recess portions 19 and the projecting portions 20 are fitted to each other is formed or not, based on the sense of the fingertip is easily performed as compared to the case where the auxiliary projecting parts 20B and the protrusion portions 24 are not disposed.

Because of a large torque variation caused by the torque varying portion 26, "unsmooth feeling" in the operation of turning the union nut 2, i.e., a feeling corresponding a click feeling due to a detent mechanism is clearly transmitted to the fingers of the worker also through the tool such as a spanner. Therefore, it is possible to recognize the state of near end of fastening. In the resin pipe joint A of Embodiment 1 in which the recess portions 19 exist in the eight places, when six "unsmooth feelings" including initial clear "unsmooth feeling" are sensed, the operation of turning the union nut 2 may be ended, and, at this time, the setting in which the assembled state shown in FIG. 1 and FIG. 4(c) is obtained is formed.

Next, further fastening of the union nut 2 will be described. In order to compensate the reduction of the force of holding the tube 3 due to aging, the resin pipe joint A is set so that further fastening of the union nut 2 can be slightly performed. In the assembled state [see FIGS. 1 and 4(c)], there are the gaps in the direction of the axis P between the side peripheral face 1a of the outer peripheral flange 1A and the side peripheral faces 18a of the arcuate projections 18. Therefore, an operation of further fastening due to further turning of the union nut 2 can be performed by the degree corresponding to the gaps.

When both the side peripheral faces 1a, 18a butt against each other, the union nut 2 cannot be further fastened, and a final further-fastening state is attained. Since the final further-fastened state is formed, there is an advantage that breakages of the pipe joint A such as thread skipping of the external thread 5 and the internal thread 8, and neck breakage are prevented from occurring. The recess portions 19 are radially passed through [see FIG. 3(b)], and the fitting state with respect to the projecting portions 20 can be seen. When a structure where the recess portions 19 and the projecting portions 20 butt against each other in the direction of the axis P before the arcuate projections 18 and the outer peripheral flange 1A butt against each other is employed, for example, the final further-fastening state can be visually known.

Embodiment 2

A resin pipe joint A of Embodiment 2 is identical with the resin pipe joint A of Embodiment 1 except the structure of the torque varying portion 26. Therefore, only the differently structured torque varying portion 26 will be described. As shown in FIGS. 6 to 8, the torque varying portion 26 in Embodiment 2 has a structure configured by: four projecting portions 20 having an outer diameter which is smaller than that of the outer peripheral flange 1A; and eight recess portions 19 which are formed in the end of the union nut 2 on the side of the internal thread in a state where the recess portions are not passed through to the radially outward side.

As shown in FIG. 8, namely, the torque varying portion has a shape in which the recess portions 19 (see FIG. 3 and the like) in the union nut 2 in Embodiment 1 are covered by the protrusion portions 24 which are extended in the direction of the axis P. As shown in FIG. 6(c), therefore, the parts of the projecting portions 20 which enter the recess portions 19 cannot be seen from the outside (this is not applicable in the case where the union nut 2 is made of a transparentable resin material).

Figure 6A:
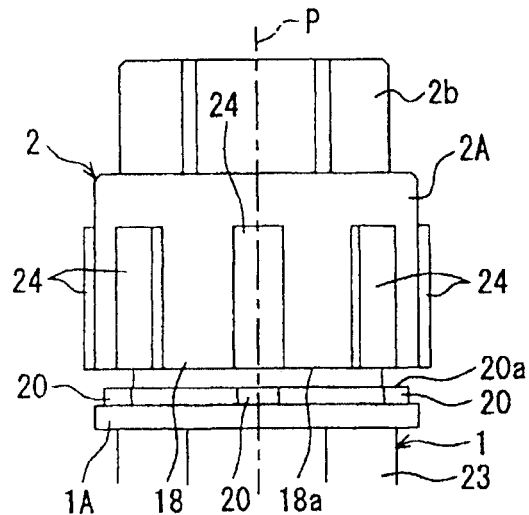
FIG. 6 shows assembling functions of a resin pipe joint of Embodiment 2, (a) shows a state where recess portions and projecting portions are separated from each other, (b) shows a state where the tip end of the union nut butts against an outer peripheral flange, and (c) shows an assembling state where the projecting portions are fitted to the recess portions.
Figure 6B:
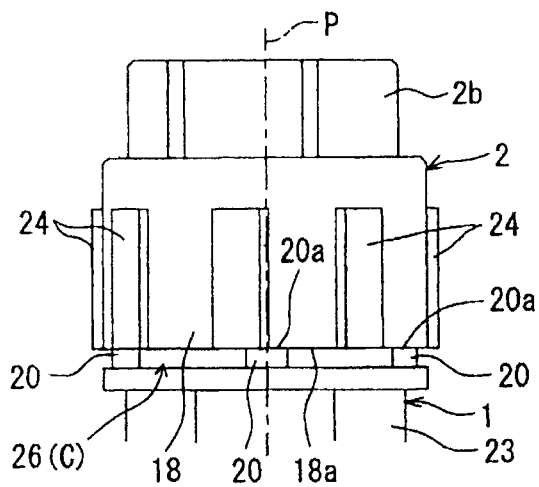
Figure 6C:
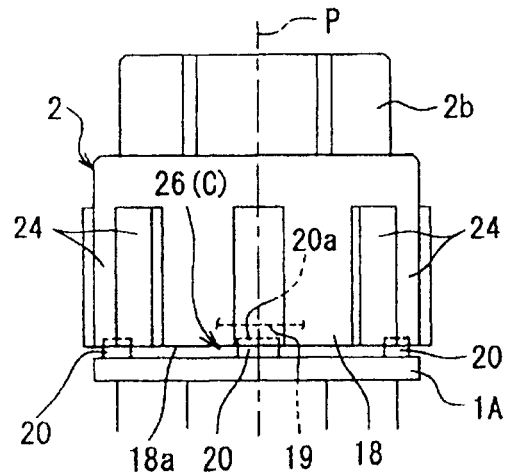

FIGS. 6(a) to 6(c) show assembly function views of the resin pipe joint A of Embodiment 2. FIGS. 6(a) and 6(b) are identical with the case of Embodiment 1 shown in FIGS. 4(a) and 4(b). In the fastening ended state (assembled state) shown in FIG. 6(c), it is seen that tip end portions of the projecting portions 20 in the direction of the axis P are fitted into the recess portions 19 which cannot be seen from the radial outside. In FIG. 6, it is seen also that the protrusion portions 24 are extended to the end portions of the union nut 2.

Other Embodiments Related to Embodiments 1 and 2

The number of the recess portions 19 is requested to be equal to or larger than that of the projecting portions 20, and the projecting portions 20 are requested to be one or more. Although not illustrated, the torque varying portion 26 may be configured so that recess portions which are recessed in the direction of the axis P are placed in the outer peripheral flange 1A, and projecting portions which are projected in the direction of the axis P are placed in the end portion of the union nut 2 in the direction of the axis P. The invention may be applied to a joint having a structure in which a tube flared portion is internally fitted to a fitting cylinder by using an inner ring, i.e., a resin pipe joint configured by three components, or a union nut, a joint body, and an inner ring.

Embodiment 3

Figure 12:
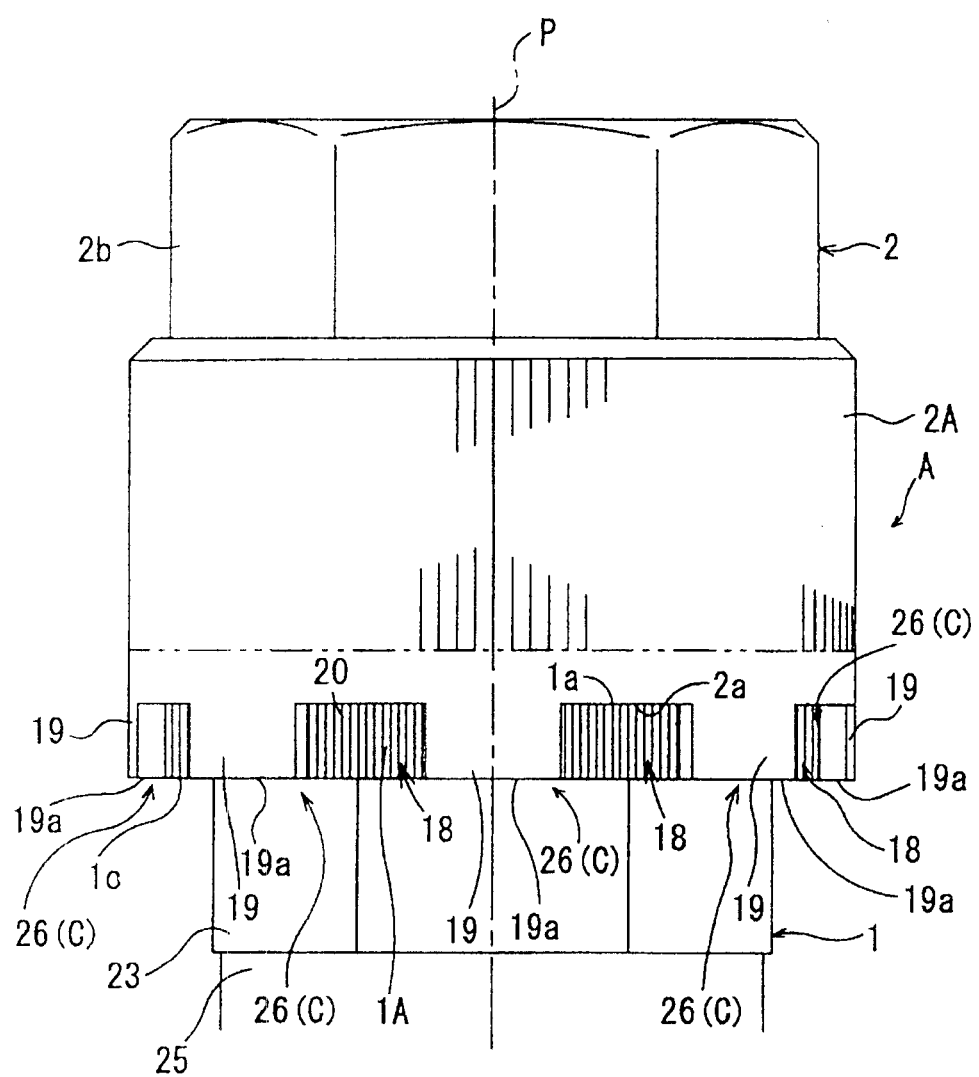
FIG. 12 is a plan view showing a state where further fastening of the resin pipe joint of FIG. 9 is completed.

As shown in FIGS. 9, 10, and 12, a resin pipe joint A of Embodiment 3 communicatingly connects a tube 3 made of a fluorine resin (an example of a synthetic resin which is typified by PFA, PTFE, and the like) to a fluid apparatus such as a pump or a valve, or a tube of the same or different diameter, and is configured by two components or a joint body 1 made of a fluorine resin (an example of a synthetic resin which is typified by PFA, PTFE, and the like), and a union nut 2 made of a fluorine resin (an example of a synthetic resin which is typified by PFA, PTFE, and the like). FIG. 9 shows a fastening ended state (assembled state) in which the union nut 2 is fastened by a predetermined degree.

As shown in FIGS. 9, 10, and 12, the joint body 1 is formed into a cylindrical member including: an inner cylinder (an example of a fitting cylinder) 4 having one end to which an end portion of the tube 3 can be externally fitted and attached while flaring the end portion; a cover cylinder portion 6 which is put over an outer peripheral side of an inner deep side portion of the inner cylinder 4 with forming a peripheral groove m that extends in the direction of the axis P, and that allows the tip end of the flared tube 3 to be inserted; an external thread 5 which is configured by a trapezoidal screw; and a fluid path 7 which is a columnar space having the axis P. The inner cylinder 4 is formed into a straight shape having an end-tapered cylinder portion 4A which causes the tube 3 to be gradually flared; and a straight barrel cylinder portion 4B which is formed in succession to a large-diameter side of the end-tapered cylinder portion 4A.

In the peripheral groove m, an outer peripheral face which is a peripheral face on the radially inward side is an outer peripheral face 4b of the straight barrel cylinder portion 4B, and that which is a peripheral face on the radially outward side is an inner peripheral face 6a of the cover cylinder portion 6. An outer peripheral flange 1A is formed in a place which is separated by a predetermined length in the direction of the axis P from a deep-side peripheral face 21 of the peripheral groove m. An external thread 5 is formed from a substantially base place of the outer peripheral flange 1A to the outer peripheral face of an end portion of the cover cylinder portion 6. The tip end face of the inner cylinder 4 is formed by a reverse taper angle which, as advancing toward the radially inner side, is closer to the inner deeper side (the deeper side in the direction of the axis P). Namely, a cut face 16 in which the diameter is larger as further advancing toward the tip end is formed, and the shape of a liquid pool peripheral portion 17 formed by expandingly displacing the inner peripheral face of the tube toward the flared portion is made to have an inner-peripheral side flared shape, so that the fluid hardly stagnates in the liquid pool peripheral portion 17.

The cut face 16 is formed so that its maximum diameter has a substantially intermediate value between the inner and outer diameters of the tube 3 in a natural state. However, the value is not limited to this. An operation hexagonal nut portion 23 having a constant width in the direction of the axis P, and a pipe portion (connecting portion) 25 (see FIGS. 11 to 13) which is continuous thereto are formed in the side of the flange 1A opposite to the external thread 5 in the direction of the axis P.

In the joint body 1, as shown in FIGS. 9, 10, and 12, the outer peripheral flange 1A which allows covering due to pressing external fitting of protruding covers 19 (described later) that are formed in the end portion (axial end) of the union nut 2 in the direction of the axis P is formed. The outer peripheral flange 1A is larger in diameter than the hexagonal nut portion 23 and the external thread 5, has a thickness (width) in the direction of the axis P which is sufficiently large, and is high in strength and rigidity. The outer peripheral face of the outer peripheral flange 1A is formed into an irregular outer peripheral face 20 (an example of a second rough peripheral face) which is configured by continuously forming minute asperities in a predetermined amount in the circumferential direction. Specifically, the irregular outer peripheral face 20 is configured by forming knurls on the outer peripheral face of the outer peripheral flange 1A by a knurling process. In Embodiment 1, as the knurls, the straight pattern is employed. Alternatively, the cross pattern or the diamond pattern may be employed.

As shown in FIGS. 9, 10, and 12, the union nut 2 includes: an internal thread 8 which is screwable with the external thread 5; a seal peripheral edge (an example of a seal pressing portion) 10 which is actable on a small-diameter end portion of a flaring changing region 9 in a flared portion 3A of the tube 3, the flared portion being externally fitted to the inner cylinder 4; a slipping-off prevention peripheral edge 11 which is actable on a large-diameter end portion of the flaring changing region 9; a pressing inner peripheral portion 13 which is externally fittable to a flared straight portion 12 of the flared portion 3A, the flared straight portion surrounding the constant-diameter straight barrel cylinder portion 4B; and a guide cylinder portion 14 which surrounds the tube 3 over a predetermined length in the direction of the axis P in succession to the seal peripheral edge 10.

In the seal peripheral edge 10, the inner diameter is substantially equal to the outer diameter of the tube 3, and a pressing face 10a is formed as a side peripheral face which is perpendicular to the axis P. In the slipping-off prevention peripheral edge 11, the diameter of the inner peripheral face is set to a value which is larger than the diameter of the outer peripheral face 4b of the straight barrel cylinder portion 4B which has the maximum diameter in the inner cylinder 4, and smaller than a diameter to which the thickness of the tube 3 is added, i.e., the diameter of the pressing inner peripheral portion 13, but may not have such a value (for example: it may be smaller than the diameter of the outer peripheral face 4b) as far as it acts on the large-diameter portion of the flaring changing region 9. Also a pressing face 11a of the slipping-off prevention peripheral edge 11 is a side peripheral face which is perpendicular to the axis P.

The pressing inner peripheral portion 13 is set to a value at which it is press-inserted (pressingly contacted with and externally fitted) to the flared straight portion 12 in a degree in which a radial gap is not formed between the pressing inner peripheral portion and the flared straight portion 12, and co-rotation of the flared portion 3A due to fastening of the union nut 2 does not occur, and slipping-off preventing means N is configured. This is conducted in order that the fastening of the union nut 2 causes the slipping-off prevention peripheral edge 11 to press the flared straight portion 12 so as to bite in the axial direction in order to block slipping off of the tube 3, and relief deformation in which the flared straight portion 12 is radially outward expanded is prevented from occurring by the pressing force, thereby obtaining the enhanced resistance against pulling due to cooperation with the slipping-off prevention pressing portion 11.

As shown in FIGS. 9, 10, and 12, in the internal-thread end which is an end portion of the union nut 2 in the direction of the axis P, the protruding covers 19 which have an arcuate eave-like shape protruded therefrom in the direction of the axis P, which are pressingly externally fitted to the outer peripheral flange 1A, and which can radially cover are formed. The protruding covers 19 have a shape which is obtained by dividing a cylindrical axial end portion (internal-thread formed end portion) of the union nut 2 into a plurality of sections in the circumferential direction, i.e., an eave-like or flange-like shape which is arcuate as seen in the direction of the axis P, and are formed in eight places arranged at intervals of uniform angles (45 degrees) about the axis P.

The outer diameter of the protruding covers 19 coincides with that of the union nut 2, and their inner diameter is set to be equal to or slightly smaller than the outer diameter of the outer peripheral flange 1A. The inner peripheral face of each of the protruding covers 19 is formed into an irregular inner peripheral face (an example of a first rough peripheral face) 24 which is configured by continuously forming minute asperities in a predetermined amount in the circumferential direction. Specifically, the irregular inner peripheral face 24 is configured by forming knurls on the inner peripheral face of the protruding cover 19 by a knurling process. In Embodiment 1, as the knurls, the straight pattern is employed. Alternatively, the cross pattern or the diamond pattern may be employed.

The portions between the protruding covers 19, 19 which are adjacent to each other in the circumferential direction are formed as window portions 18. In short, the window portions 18 are places where the protruding covers 19 are not disposed, and the nut end face 2a is exposed over the whole region in a radial direction. The nut end face 2a is formed as a stopper face which can butt against the outer peripheral flange 1A in the direction of the axis P in accordance with the screw advancement of the union nut 2.

Next, the end portion of the tube 3 is externally fitted and inserted into the inner cylinder 4 by forcibly pushing the tube 3 at normal temperature to be attached while being flared, by heating the tube with using a heating source so as to be easily expandingly deformed and then pushing it, or by previously flaring the tube end with using a flaring machine (not shown) and then pushing it into the inner cylinder 4, so that a state where the tube is inserted until the tube end 3t is positioned deeper than the end wall 15 of the cover cylinder portion 6 is obtained as shown in FIG. 9. As shown in FIG. 9, the flared portion 3A which is externally fitted and attached to the inner cylinder 4 is configured by the flaring changing region 9 which is externally fitted to the outer peripheral face 4a of the end-tapered cylinder portion 4A, and the flared straight portion 12 which is externally fitted to the outer peripheral face 4b of the straight barrel cylinder portion 4B.

As shown in FIG. 9, namely, it is set so that, by the screw advancement in the direction of the axis P of the joint body 1, the screw advancement being caused by the fastening of the union nut 2 due to screwing of the internal thread 8 to the external thread 5 in a state where the tube 3 is externally fitted and attached to the inner cylinder 4, the pressing inner peripheral portion 13 is externally fitted to the flared straight portion 12, a portion of the large-diameter portion of the flaring changing region 9 is pressed in the direction of the axis P by the slipping-off prevention peripheral edge 11, the diameter of the portion being larger than that of the inner cylinder 4, and the small-diameter portion of the flaring changing region 9 is pressed in the direction of the axis P by the seal peripheral edge 10. The diameter of the fluid transfer path 3W of the tube 3, and that of the fluid path 7 are set to be equal to each other in order to attain a smooth fluid flow. Alternatively, the diameters may be different from each other.

In this case, as described above, the state is formed where a gap is not formed in a radial direction between the pressing inner peripheral portion 13 and the flared straight portion 12, and the flared straight portion 12 is pressingly contacted with and interposed between the straight barrel cylinder portion 4B and the pressing inner peripheral portion 13. In Embodiment 1, the flaring changing region 9 of the tube 3 is formed as a portion which is put over the end-tapered cylinder portion 4A. The flaring changing region 9 is in a state of a tapered pipe which is gradually flared, and the seal peripheral edge 10 and the slipping-off prevention peripheral edge 11 are in positional relationships in which they are separated from each other in the direction of the axis P. As the angle formed by the outer peripheral face 4a of the end-tapered cylinder portion 4A and the axis P is steeper, the distance between the seal peripheral edge 10 and the slipping-off prevention peripheral edge 11 in the direction of the axis P is shorter. The seal peripheral edge 10 and the tip end of the inner cylinder 4 are slightly separated from each other in the direction of the axis P. When the angle of the outer peripheral face 4a is steep, the separation distance is increased, and, when the angle is gentle, the separation distance is decreased.

As shown in FIG. 9, in the predetermined assembled state of the resin pipe joint A, the seal peripheral edge presses the small-diameter portion of the flaring changing region 9 of the tube 3 in the direction of the axis P, and hence the end of the small-diameter side of the outer peripheral face 4a of the flaring changing region 9, and the inner peripheral face of the tube 3 adjoining the place are strongly pressingly contacted, and a sealing portion S is formed. The sealing portion S in the tip end place of the inner cylinder 4 enables the tube 3 and the joint body 1 to be satisfactorily sealed without causing a fluid such as a washing solution or a medical solution to enter between the inner cylinder 4 and the flared portion 3A.

The flared straight portion 12 of the flared portion 3A which is pressingly externally fitted to the inner cylinder 4 is surrounded by the outer peripheral face 4b of the straight barrel cylinder portion 4B and the pressing inner peripheral portion 13, and held so as not to be expandingly deformed, and the slipping-off prevention peripheral edge 11 is positioned so as to substantially bite the flared straight portion 12. This can resist a pulling force which is acted on the flared portion 3A by engagement of the slipping-off prevention peripheral edge 11 which presses the flared straight portion 12 so as to bite the large-diameter portion of the flaring changing region 9, i.e., substantially the flared straight portion 12, and can brake and block a sliding movement of the flared portion 3A in the slipping-off direction due to that the flared straight portion 12 can be expandingly deformed in a radial direction by the pulling force while using the slipping-off prevention peripheral edge 11 as the basing point.

Even when the flared portion 3A is slightly slidingly moved in the direction of the axis P, also the seal point in the sealing portion S is shifted, and there is a possibility that the sealing function becomes uncertain. This can be prevented from occurring. Therefore, the slipping-off preventing means N for strongly regulating a movement in the direction of the axis P and in the direction along which the flared portion 3A slips off from the inner cylinder 4 is configured, thereby realizing an excellent resistance against pulling. As a result, the flare type resin pipe joint A configured by the joint body 1 and the union nut 2 is realized as an improved configuration which can be simply assembled by a nut operation in a state where the tube is attached to the inner cylinder, thereby attaining an excellent assembling property, and both the excellent sealing property due to the sealing portion S, and the high resistance against pulling due to the slipping-off preventing means N can be attained.

In addition, it is set to a state where, after start of the pressing of the large-diameter portion of the flaring changing region 9 by the slipping-off prevention peripheral edge 11, the pressing of the small-diameter portion of the flaring changing region 9 by the seal peripheral edge 10 is started, namely, it has pressing time difference means, whereby providing the following functions and effects. Namely, when the union nut 2 is turned and fastened (screw advanced), the slipping-off prevention peripheral edge 11 first butts against the flaring changing region 9 (in detail, the large-diameter portion of the flaring changing region 9), and at this time the seal peripheral edge 10 does not reach the flaring changing region 9. Therefore, only the slipping-off prevention peripheral edge 11 presses in the direction of the axis P the large-diameter portion of the flaring changing region 9, in more detail, the portion in which the diameter is larger than that of the straight barrel cylinder portion 4B, and hence a function of pressing the flaring straight portion 12 into the inner deeper portion of the inner cylinder 4 is produced by the operation of fastening the union nut 2.

The flaring straight portion 12 which is pressingly inserted into and externally fitted to the straight barrel cylinder portion 4B butts also against the pressing inner peripheral portion 13. In the case where the press contact force is relatively weak, the portion tries to slide the flared portion 3A so as to be inserted into the inner deeper side of the inner cylinder 4. Therefore, preferred effects are obtained such as that the tube is inserted into the joint body 1 more surely, and that the flaring straight portion 12 which is pressed in the direction of the axis P is hardly moved in the direction of the axis P, and hence tries to radially expand to further enhance the press contact force, thereby producing a function of being firmly interposed. In the case where the press contact force is relatively strong, the flaring straight portion 12 which is pressed in the direction of the axis P is substantially immobile in the direction of the axis P, and hence a strong function of radially expanding is produced, thereby obtaining an effect that the flared straight portion 12 is held more firmly between the inner cylinder 4 and the pressing inner peripheral portion 13.

Anyway, the slipping-off prevention peripheral edge 11 presses the flared portion 3A in the direction of the axis P under the situation where the seal peripheral edge 10 does not exert a function of sticking in the flared portion 3A, thereby obtaining an effect that the press contacting and holding force of the flared straight portion 12 due to the straight barrel cylinder portion 4B and the pressing inner peripheral portion 13 is enhanced. For example, the portion of the flared portion 3A which is pressed by the slipping-off peripheral edge 11 flows to the radially outward side to fill an edge space portion formed by the pressing face 11a and the pressing inner peripheral portion 13. As described above, the pressing time difference means provides an effect that, with respect to the inner cylinder 4 of the tube 3, the press contacting and holding force and the resistance against pulling are further improved.

As shown in FIG. 9, indicator means B which can visually check whether the tube 3 is correctly inserted into the inner cylinder 4 or not is configured by: the peripheral groove m that is formed by the inner deep side of the inner cylinder 4, and the cover cylinder portion 6; and the union nut 2 that is formed by a transparentable fluorine resin. In the case where viewing is conducted along a line which passes a valley-like inner peripheral face 22 that is on the inner deep side of the pressing inner peripheral portion 13, and that extends to the internal thread 8, when the normal state where the flared portion 3A is seen and the flared end portion 3t is not seen is obtained, it is possible to determine that the tube 3 is correctly externally fitted and attached to the inner cylinder 4. When a mal-insertion state where the flared portion 3A is seen and the flared end portion 3t is seen is obtained, or when an insufficient insertion state where the flared end portion 3A itself is not seen is obtained, it is possible to determine that the insertion of the tube 3 does not reach a specified amount. In this case, an operation of further pressing the tube 3 is performed until the above-described normal state can be seen.

In the indicator means B, the union nut 2 is formed by using a transparent or translucent (opalescent or the like) fluorine resin, and an object thereinside can be visually checked. In viewing along the line which passes the valley-like inner peripheral face 22 that is on the inner deep side of the pressing inner peripheral portion 13, and that extends to the internal thread 8, particularly, the flared portion 3A can be visually checked in a relatively clear manner by see-through of only the reduced-thickness portion of the union nut 2. In the region of the pressing inner peripheral portion 13 which is thicker than the region of the valley-like inner peripheral face 22, by contrast, the visuality of the flared portion 3A is inferior, and it is hardly seen.

In the portion of the peripheral groove m into which the end portion of the tube 3 can enter, the union nut 2 and the cover cylinder portion 6 overlap with each other. Although also the joint body 1 is transparentable, the thickness is larger than that of the portion of the valley-like inner peripheral face 22, and also a change of the refractive index in the interface caused by the overlap of the external thread 5 and the internal thread 8 is added, so that it is substantially impossible to visually check where the flared end portion 3t is positioned. In the case where the joint body 1 is untransparentable because of coloring or the like, it is a matter of course that, in the side of the cover cylinder portion 6 which is deeper than the end wall 15, the flared portion 3A and the flared end portion 3t cannot be seen.

Therefore, it is possible to provide the resin pipe joint A in which the function of the indicator means B determining whether the normal state where the flared portion 3A is seen from the valley-like inner peripheral face 22 and the flared end portion 3t is not seen can be visually checked or not allows a visual check to be performed in the assembled state after the union nut 2 is fastened, and which has excellent convenience of use.

Because of the existence of the peripheral groove m and cover cylinder portion 6 for constituting the indicator means B, it is possible to attain also an effect that it functions also as an indicator in the case where the tube 3 is inserted into the inner cylinder 4. Namely, it is possible to check whether the amount of insertion of the tube 3 into the inner cylinder 4 after being flared reaches a predetermined amount or not. In other words, it is requested that the end portion 3t which is inserted into the inner cylinder 4, and which functions as the flared portion 3A exists deeper than the end wall 15, and there is an advantage that it functions also as means for visually checking and determining whether it is good or not, when the tube 3 is assembled to the inner cylinder 4.

In the resin pipe joint A, fastening end perception means C which can recognize the end (or near the end) of the fastening of the union nut 2 in an assembling work state in which the tube 3 is inserted, and then fastened and fixed by the union nut 2, through both a sliding sound and torque variation is disposed. As shown in FIGS. 9, 10, and 12, the fastening end perception means C is configured by disposing a sliding fitting portion 26 in which the irregular outer peripheral faces 20 of the outer peripheral flange 1A of the joint body 1 and the irregular inner peripheral faces 24 of the protruding covers 19 which are formed on the tip end side (on the side of the internal thread 8) of the union nut 2 are forcedly fitted to each other so as to attain a press insertion state. The sliding fitting portion 26 is configured by disposing a structure in which the irregular inner peripheral faces 24 and the irregular outer peripheral faces 20 are forcedly fitted to each other by a flexural displacement of the irregular inner peripheral faces 24, i.e., the protruding covers 19, in accordance with fastening rotation of the union nut 2 from the vicinity of a portion in front of the end of the screw advancement where the seal peripheral edge 10 presses the flaring changing region 9 and the sealing portion S is formed.

In the resin pipe joint A of Embodiment 3, the union nut 2 having the protruding covers 19, and the joint body 1 having the outer peripheral flange 1A are correlatively formed so that, when the tip end faces 19a of the protruding covers 19 are located in a substantially middle of the width of the outer peripheral flange 1A, i.e., the width in the direction of the axis P, the fastening end state of the union nut 2 (the assembled state as the joint A) is attained, whereby the sliding fitting portion 26 is configured.

The function of the sliding fitting portion 26 will be described. When the union nut 2 is fastened by, for example, applying a tool to the hexagonal nut portion 2b, the union nut 2 is screw advanced, and the protruding covers 19 approach the outer peripheral flange 1A as shown in FIG. 11. In the relative positional relationships between the joint body 1 and the union nut 2 shown FIG. 11, the peripheral edges 10, 11 have not yet reached the flaring changing region 9 of the tube 3. When the union nut 2 is further turned in the fastening direction, the tip end portions of the protruding covers 19 are flexed in a radially outward direction to be forcedly externally fitted to the outer peripheral flange 1A, and begin to cover the flange so as to radially overlap therewith. When the union nut 2 is further turned in the fastening direction to be screw advanced, the tip end faces 19a of the protruding covers 19 are located in the middle in the width direction (the direction of the axis P) of the outer peripheral flange 1A as shown in FIGS. 9 and 12.

When the protruding covers 19 are externally fitted to the outer peripheral flange 1A, the irregular inner peripheral faces 24 and the irregular outer peripheral faces 20 are relatively rotatingly moved while sliding (contacting with each other), to continuously generate a sliding sound, and a torque increase due to the above, i.e., a state where a large torque for turning the union nut 2 is suddenly required is caused. Namely, the function of the sliding fitting portion 26 enables the worker to recognize the state of near end of fastening, or the state of end of fastening on the bases of both a sound and a torque increase (torque variation), whereby the fastening end perception means C is configured. Therefore, the state of end of fastening the union nut 2 can be recognized irrespective of the presence of noises in the working environment.

In Embodiment 3, when the tip end faces 19a reach the halfway position of the width of the outer peripheral flange 1A, as described above, the sealing portion S is formed to attain the state of end of fastening and the assembled state as the resin pipe joint A. The assembled state is set so as to attain a state where the sealing function due to the seal peripheral edge 10, and the slipping-off preventing function due to the slipping-off prevention peripheral edge 11 are effectively exerted. In the state of end of fastening, the positioning of the tip end faces 19a of the protruding covers 19 in the middle in the width direction of the outer peripheral flange 1A can be recognized also by visual check. Furthermore, the existence of the tip end faces 19a on the irregular outer peripheral face 20 of the outer peripheral flange 1A can be recognized also by fingertip feeling.

There are the window portions 18 between the portions between the protruding covers 19, 19 which are adjacent to each other in the circumferential direction. Therefore, there is an advantage that the overlapping conditions such as the degree of the overlaps of the protruding covers 19 over the outer peripheral flange 1A, the position of the tip end face 1a in the width of the outer peripheral flange 1A in the direction of the axis P, and the size of the gap in the direction of the axis P between the side peripheral face 1a on the side of the external thread and the nut end face 2a can be visually checked through the window portions 18.

Next, further fastening of the resin pipe joint A will be described. The resin pipe joint is configured so that the nut end face 2a and the outer peripheral flange 1A are butted against each other by an operation of slightly fastening the union nut 2 in the screw advancement end state (fastening end state). Further fastening can be performed by a degree corresponding to the screw advancement due to this. Namely, the resin pipe joint is set so that, when the union nut 2 in the fastening end state (assembled state) shown in FIGS. 9, 10, and 12 is further turned in the fastening direction, the nut end face 2a is butted against the side peripheral face 1a of the outer peripheral flange 1A on the side of the external thread to reach the fastening limit as shown in FIG. 13, and, at this time, the tip end faces 19a of the protruding covers 19 is flush (at the same position) with the side peripheral face 1c of the outer peripheral flange 1A on the side of the nut, in the direction of the axis P.

Figure 13:
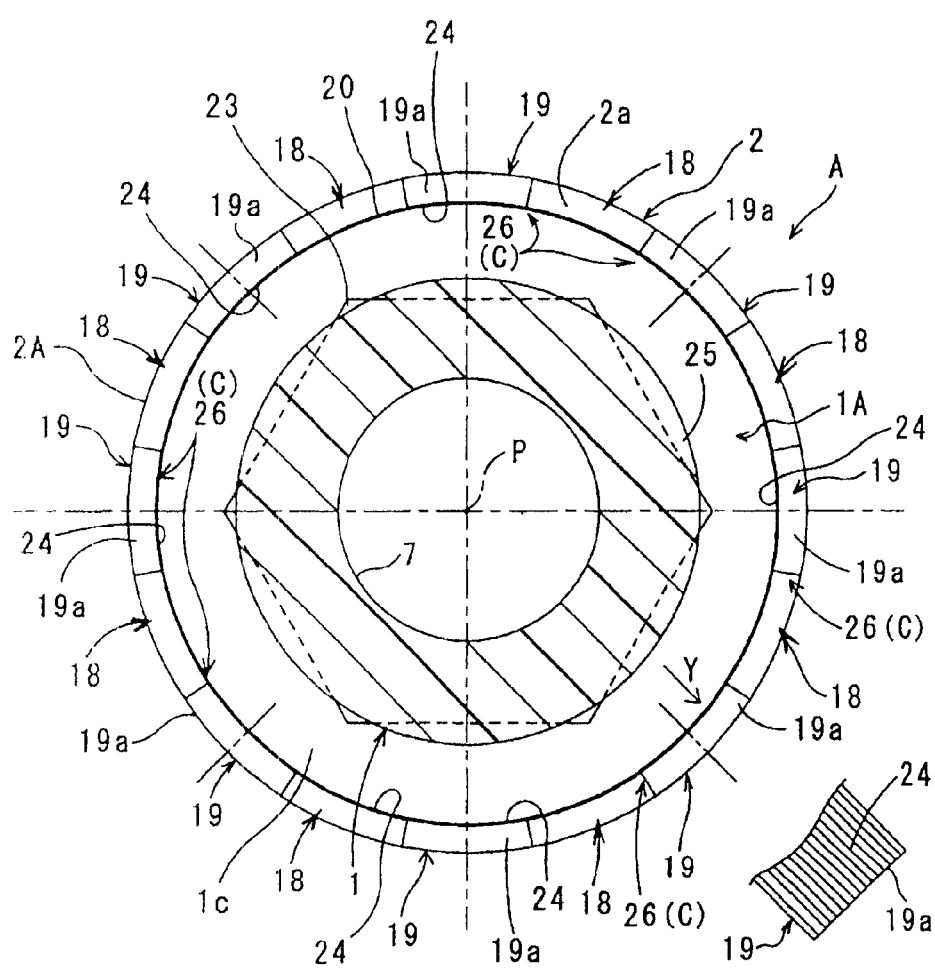
FIG. 13 is an axial direction view showing a meshing situation between first and second rough peripheral faces.

When a final further-fastening state shown in FIG. 13 is attained, there is an advantage that breakages of the pipe joint A such as thread skipping of the external thread 5 and the internal thread 8, and neck breakage are prevented from occurring. Namely, the resin pipe joint A of Embodiment 1 is configured so that also further fastening for compensating loosening of the union nut 2 due to aging or the like is enabled. In this case, the state where the tip end faces 19a of the protruding covers 19 are flush with the side peripheral face 1c of the outer peripheral flange 1A on the side of the nut can be recognized by a visual check or fingertip feeling. The function can be exerted by the fastening end perception means C.

Other Embodiments Related to Embodiment 3

In the irregular inner peripheral faces 24, i.e., the protruding covers 19, the number, the protrusion length in the direction of the axis P, or the length in the circumferential direction can be adequately changed. The end portion of the union nut 2 on the side of the internal thread may be formed into a cylindrical shape, and the whole inner peripheral face may be formed as the irregular inner peripheral faces 24. In Embodiment 1, the irregular outer peripheral face 20 formed on the outer peripheral flange 1A is formed in the whole circumference, and alternatively may be intermittently formed in the circumferential direction.

The invention may be applied to a joint having a structure in which a tube flared portion is internally fitted to a fitting cylinder by using an inner ring, i.e., a resin pipe joint configured by three components, or a union nut, a joint body, and an inner ring. Although illustration and detailed description are omitted, a resin pipe joint having a configuration where an outer peripheral flange having an irregular outer peripheral face (second rough peripheral face) is formed in an axial end portion of a union nut, and protruding covers which have an irregular inner peripheral face (first rough peripheral face) that is forcedly fitted to the outer peripheral flange, and which are coverable are formed in a joint body may be possible.

DESCRIPTION OF REFERENCE NUMERALS 1 joint body
1A outer peripheral flange
1b outer peripheral face of outer peripheral flange
2 union nut
3 tube
3A flared portion
4 fitting cylinder
5 external thread
8 internal thread
9 flaring changing region
10 seal pressing portion
19 recess portion, protruding cover
20 projecting portion, second rough peripheral face
20B protruding portion
24 protrusion portion, first rough peripheral face
26 torque varying portion
C fastening end perception means
P axis
S sealing portion

The invention claimed is:

1. A resin pipe joint, said resin pipe joint having:
a synthetic resin-made joint body formed of a single piece of a fluorine resin, portions of the synthetic resin-made joint body being an external thread, a fitting cylinder, and a projecting portion, an end portion of a synthetic resin-made tube being fittable and attachable to the fitting cylinder; and
a synthetic resin-made union nut including: an internal thread which is screwable with said external thread; and a seal pressing portion which is actable on a flaring changing region in a flared portion of said tube, the flaring changing region having diameters that change from a first diameter to a second diameter, the first diameter being an inner diameter of the union nut and the second diameter being an outer diameter of the fitting cylinder,
by a screw advancement of said union nut in a direction of an axis of said joint body, the screw advancement being caused by screwing said internal thread to said external thread in a state where said tube is fitted and attached to said fitting cylinder, said flaring changing region being pressed in the direction of the axis by said seal pressing portion to form a sealing portion, wherein
said projecting portion is projected in the direction of the axis and integrally formed on an outer peripheral portion of said joint body, and a recess portion is recessed in the direction of the axis to be fittable to the projecting portion and provided in an outer peripheral portion of an end portion in the axial direction of said union nut, and said projecting portion and said recess portion are unfitted from each other by bending said projecting portion from an upright position in the direction of the axis in accordance with fastening rotation of said union nut and fitted to each other by returning said bended projecting portion to the upright position,
wherein said projecting portion is formed on an outer peripheral flange of said joint body, said recess portion is formed in said end portion of said union nut on a side where said internal thread is formed, and said projecting portion and said outer peripheral flange are configured to be flexurally deformable in the direction of the axis,
a protruding portion is formed on said projecting portion, the protruding portion being protruded toward a radially outward side of an outer peripheral face of said outer peripheral flange, and a protrusion portion is formed at a portion of said union nut which is adjacent to said recess portion in the direction of the axis, the protrusion portion being protruded toward the radially outward side of said union nut,
said union nut is made of a fluorine resin, and
when the projecting portion is fitted in the recess portion, the outer diameter of the projecting portion in the recess portion is larger than the diameter of the outer peripheral portion of the end portion of the union nut in which the recess portion is formed.

2. The resin pipe joint according to claim 1, wherein said projecting portion and/or said recess portion are formed in a plural number in the circumferential direction, and configured so that the fitting and the unfitting are repeated when said union nut is turned one rotation.

3. The resin pipe joint according to claim 2, wherein said projecting portions and/or said recess portions are formed in the circumferential direction at intervals of uniform angles about the axis.

* * * * *